US011292735B1

(12) United States Patent
Lynn

(10) Patent No.: US 11,292,735 B1
(45) Date of Patent: Apr. 5, 2022

(54) OZONE SUPPLY UNIT WITH NETWORK OF AUXILIARY COMPARTMENTS CONTAINING MIXING ASSEMBLIES FOR GENERATING AQUEOUS OZONE SOLUTION

(71) Applicant: Daniel W. Lynn, Omaha, NE (US)

(72) Inventor: Daniel W. Lynn, Omaha, NE (US)

(*) Notice: Subject to any disclaimer, the term of this patent is extended or adjusted under 35 U.S.C. 154(b) by 0 days.

(21) Appl. No.: 17/504,980

(22) Filed: Oct. 19, 2021

Related U.S. Application Data

(63) Continuation-in-part of application No. 17/378,977, filed on Jul. 19, 2021, now Pat. No. 11,198,627, which is a continuation-in-part of application No. 17/325,966, filed on May 20, 2021, now Pat. No. 11,098,910, which is a continuation-in-part of application No. 17/200,799, filed on Mar. 13, 2021, now Pat. No. 11,045,571.

(51) Int. Cl.
| | |
|---|---|
| *C02F 1/78* | (2006.01) |
| *B01F 23/23* | (2022.01) |
| *C02F 1/50* | (2006.01) |
| *C02F 1/00* | (2006.01) |
| *B01F 23/232* | (2022.01) |
| *B01F 25/312* | (2022.01) |
| *B01F 35/221* | (2022.01) |
| *B01F 101/00* | (2022.01) |

(52) U.S. Cl.
CPC .............. *C02F 1/78* (2013.01); *B01F 23/232* (2022.01); *B01F 25/312* (2022.01); *B01F 35/2217* (2022.01); *C02F 1/008* (2013.01); *C02F 1/50* (2013.01); *B01F 2101/305* (2022.01); *C02F 2201/782* (2013.01); *C02F 2209/23* (2013.01); *C02F 2303/04* (2013.01)

(58) Field of Classification Search
CPC .............. C02F 1/78; C02F 1/008; B01F 23/23
See application file for complete search history.

(56) References Cited

U.S. PATENT DOCUMENTS

| | | | |
|---|---|---|---|
| 6,153,105 | A | 11/2000 | Tadlock et al. |
| 6,334,328 | B1 | 1/2002 | Brill |
| 6,685,825 | B1 | 2/2004 | Chang |
| 8,071,526 | B2 | 12/2011 | Lynn |

(Continued)

FOREIGN PATENT DOCUMENTS

ES        1174333 U    *  1/2017 ............ C01B 13/11

*Primary Examiner* — Robert A Hopkins
(74) *Attorney, Agent, or Firm* — Nasr Patent Law LLC; Faisal K. Abou-Nasr

(57) ABSTRACT

A system for generating aqueous ozone solution includes a plurality of auxiliary compartments fluidically coupled to an ozone supply unit enclosure, wherein each of the auxiliary compartments includes a mixing assembly. At least one of the mixing assemblies includes a first flow path for water to flow through and a second flow path in parallel with the first flow path. The first flow path includes one or more ozone intake ports that are fluidically coupled to one or more ozone output ports of the ozone supply unit enclosure. The second flow path includes a control valve that selectively permits a portion of the water to flow through the second flow path to produce a negative pressure in the first flow path so that ozone is drawn into the first flow path and mixed into the water flowing through the first flow path to produce an aqueous ozone solution.

18 Claims, 13 Drawing Sheets

(56) References Cited

U.S. PATENT DOCUMENTS

| | | |
|---|---|---|
| 8,075,705 B2 | 12/2011 | Lynn |
| 9,068,149 B2 | 6/2015 | Lynn |
| 9,151,528 B2 | 10/2015 | Erbs et al. |
| 9,174,845 B2 | 11/2015 | Lynn |
| 9,522,348 B2 | 12/2016 | Lynn |
| 2002/0127158 A1 | 9/2002 | Holsclaw et al. |
| 2003/0209502 A1* | 11/2003 | Lacasse ............... C02F 9/00 210/760 |
| 2004/0004042 A1 | 1/2004 | Hadley et al. |
| 2004/0074252 A1 | 4/2004 | Shelton |
| 2004/0168989 A1 | 9/2004 | Tempest |
| 2006/0027507 A1* | 2/2006 | van Leeuwen . B01F 23/237613 210/760 |
| 2009/0142225 A1 | 6/2009 | Tornqvist |
| 2009/0185959 A1 | 9/2009 | Weber et al. |
| 2010/0219137 A1 | 9/2010 | Lacasse |
| 2013/0193081 A1 | 8/2013 | Vasiliu et al. |
| 2013/0341285 A1 | 12/2013 | Marion |
| 2014/0027388 A1 | 1/2014 | Constant |
| 2014/0263097 A1 | 9/2014 | Lynn |
| 2016/0251243 A1 | 9/2016 | Lynn |

* cited by examiner

OZONE SUPPLY UNIT WITH NETWORK OF AUXILIARY COMPARTMENTS CONTAINING MIXING ASSEMBLIES FOR GENERATING AQUEOUS OZONE SOLUTION

CROSS-REFERENCE TO RELATED APPLICATIONS

The present application is a Continuation-in-Part of U.S. application Ser. No. 17/378,977 filed Jul. 19, 2021 and titled "OZONE SUPPLY UNIT WITH AUXILIARY COMPARTMENT CONTAINING CONTROLLED SUCTION MIXING ASSEMBLY FOR GENERATING AQUEOUS OZONE SOLUTION," which is a Continuation-in-Part of U.S. application Ser. No. 17/325,966 filed May 20, 2021 and titled "HVAC DECONTAMINATION SYSTEM WITH REGULATED OZONE OUTPUT BASED ON MONITORED OZONE LEVEL IN AMBIENT AIR," which is a Continuation-in-Part of U.S. application Ser. No. 17/200,799 filed Mar. 13, 2021 and titled "REDUCED NOISE AIR DECONTAMINATOR," all of which are incorporated herein by reference.

TECHNICAL FIELD

The present disclosure relates to systems for creating aqueous ozone solutions.

BACKGROUND

Water intended for potable use (e.g., drinking water), may contain disease-causing organisms, or pathogens, which can originate from the source of the water, from resistance to water treatment techniques, from improper or ineffectual water treatment techniques, or so forth. Pathogens include various types of bacteria, viruses, protozoan parasites, and other organisms. To protect drinking water from disease-causing organisms, or pathogens, water suppliers often add a disinfectant, such as chlorine, to the water. However, disinfection practices can be ineffectual because certain microbial pathogens, such as *Cryptosporidium*, are highly resistant to traditional disinfection practices. Also, disinfectants themselves can react with naturally-occurring materials in the water to form byproducts, such as trihalomethanes and haloacetic acids, which may pose health risks.

A major challenge for water suppliers is how to control and limit the risks from pathogens and disinfection byproducts. It is important to provide protection from pathogens while simultaneously minimizing health risks to the population from disinfection byproducts. Oxidation reduction potential (ORP) can be used for water system monitoring to reflect the antimicrobial potential of the water, without regard to the water quality, with the benefit of a single-value measure of the disinfection potential, showing the activity of the disinfectant rather than the applied dose.

There are a number of systems that generate ORP in water by injecting ozone into the water to create an ozone and water solution. However, high pressure water applications present challenges, often requiring the use of an intermediate tank that must be filled prior to use (much like a water heater). To overcome such challenges, there is a need for improvements in the mixing and distribution of water and ozone solution.

SUMMARY

Aspects of this disclosure are directed to a system for generating aqueous ozone solution. In embodiments, the system includes an ozone supply unit enclosure having one or more air intake ports and one or more ozone output ports. The system further includes a plurality of ozone generators disposed within the ozone supply unit enclosure. The ozone generators are fluidically coupled to the one or more air intake ports and the one or more ozone output ports of the ozone supply unit enclosure. The system further includes a plurality of auxiliary compartments fluidically coupled to the ozone supply unit enclosure, wherein each of the auxiliary compartments contains a mixing assembly. Each of these mixing assemblies (or at least one of mixing assemblies) may include a first flow path for water to flow through and a second flow path fluidically coupled in parallel with the first flow path. The first flow path includes one or more ozone intake ports that are fluidically coupled to the one or more ozone output ports of the ozone supply unit enclosure. The second flow path includes a control valve that selectively permits a portion of the water to flow through the second flow path to produce a negative pressure in the first flow path so that ozone is drawn into the first flow path through the one or more ozone intake ports and mixed into the water flowing through the first flow path to produce an aqueous ozone solution. The control valve may be adjustable to vary the negative pressure produced in the first flow path in order to control an ozone concentration of the aqueous ozone solution.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Figure 1:
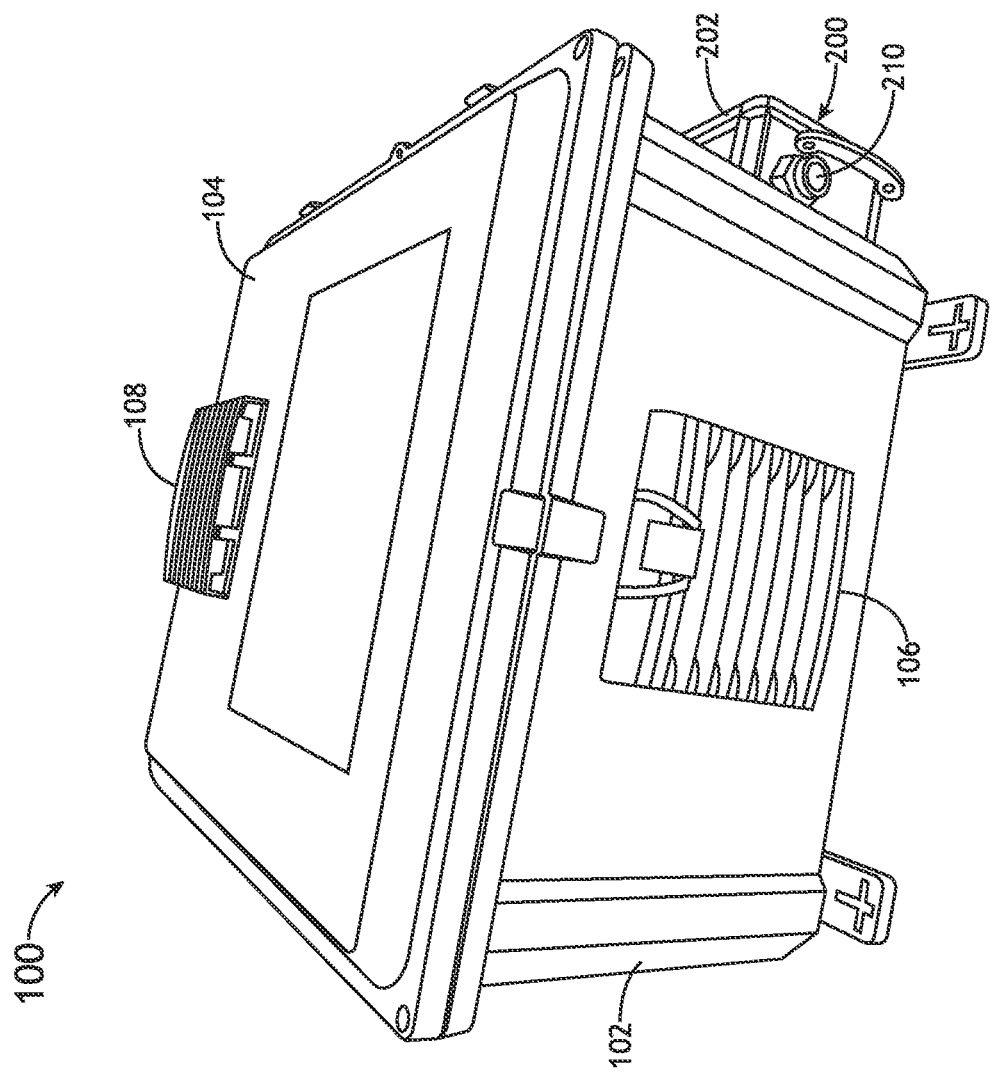
FIG. 1 is a perspective bottom view of a system for generating aqueous ozone solution, in accordance with one or more embodiments of this disclosure.

Reference will now be made in detail to the subject matter disclosed, which is illustrated in the accompanying drawings.

Embodiments of this disclosure are directed to a system that employs an ozone supply unit with an auxiliary compartment containing a controlled suction mixing assembly for generating aqueous ozone solution (e.g., a water and ozone solution). In residential or commercial applications, the system may be configured to supply the aqueous ozone solution to a janitorial fill station, a spray gun, or to one or more taps that receive water from a main water source (e.g., the main water line). In this regard, the system can be employed as household or building water cleansing, disinfecting, and/or softening solution. Alternatively, the system may be used for a particular zone of a residential or commercial building. In some cases, a plurality of systems can be used to ozonate water in a plurality of zones within a residential or commercial building. The system can also be used for cleansing and/or degreasing hard surfaces such as plastic, glass, ceramic, porcelain, stainless steel, or the like. The system can also be used for cleansing and/or degreasing equipment such as food service equipment which may include, but are not limited to, ovens, ranges, fryers, grills, steam cookers, oven stacks, refrigerators, coolers, holding cabinets, cold food tables, worktables, ice machines, faucets, beverage dispensing equipment, beer dispensers, shelving food displays, dish washing equipment, and grease traps. The system can also be used for cleansing and/or degreasing HVAC or plumbing systems such as roof top units, air scrubbers, humidifiers, water heaters, pumps, or the like.

An ORP value can be used for water system monitoring to reflect the antimicrobial potential of a given sample of water. ORP is measured in millivolts (mV), with typically no correction for solution temperature, where a positive voltage shows a solution attracting electrons (e.g., an oxidizing agent). For instance, chlorinated water will show a positive ORP value whereas sodium sulfite (a reducing agent) loses electrons and will show a negative ORP value. Similar to pH, ORP is not a measurement of concentration directly, but rather of activity level. In a solution of only one active component, ORP indicates concentration. The World Health Organization (WHO) adopted an ORP standard for drinking water disinfection of 650 millivolts. That is, the WHO stated that when the oxidation-reduction potential in a body of water measures 650 (about $2/3$ of a volt), the sanitizer in the water is active enough to destroy harmful organisms almost instantaneously. For example, *E. coli, Salmonella, Listeria*, and Staph pathogens have survival times of under 30 seconds when the ORP is above 650 mV, compared against >300 seconds when it is below 485 mV.

An example ORP sensor uses a small platinum surface to accumulate charge without reacting chemically. That charge is measured relative to the solution, so the solution "ground" voltage comes from the reference junction. For example, an ORP probe can be considered a millivolt meter, measuring the voltage across a circuit formed by a reference electrode constructed of silver wire (in effect, the negative pole of the circuit), and a measuring electrode constructed of a platinum band (the positive pole), with the water in-between.

Increasingly, microbial issues are commanding the attention of water treatment operators, regulators, media, and consumers. There are many treatment options to eliminate pathogenic microbes from drinking water. One such option includes ozone ($O_3$), an oxidizing agent approved for drinking water treatment by the U.S. Environmental Protection Agency. For instance, ozone is one of the strongest disinfectants approved for potable water treatment capable of inactivating bacteria, viruses, *Giardia*, and *Cryptosporidium*.

In some embodiments, the disclosed system may be configured to output water having an ORP of about 600 mV to about 1000 mV at approximately 1 to 5 gallons per minute (GPM), with particular embodiments being configured to output water having an ORP of about 700 mV to about 900 mV to provide pathogenic control at a flow rate of approximately 3 GPM. Additionally, the system may be configured to reduce the surface tension of the water being used to cleanse and/or degrease hard surfaces and equipment by creating a water and ozone solution wherein the surface tension of the water is reduced from about 72 Millinewtons per meter at 20 degrees Centigrade to about 48-58 Millinewtons per meter at 20 degrees Centigrade to greatly improve the cleansing and/or degreasing qualities thereof.

In embodiments, the system employs a mixing assembly for in-line mixing of water and ozone solution. Furthermore, the mixing assembly may be disposed in an auxiliary compartment that is mounted to an ozone supply unit enclosure, such that the water and aqueous ozone solution flow paths are isolated from internal components of an ozone supply unit. Through the use of a mixing assembly that is structurally isolated from the internal components of the ozone supply unit, the system is able to handle high pressure water flow through the mixing assembly without fear of a leak causing damage to electronic components associated with the ozone supply unit (e.g., ozone generators, controllers, relays, etc.). Having the mixing assembly separately contained within an auxiliary compartment can also provide more space for internal components of the ozone supply unit to produce a system with improved throughput and a reduced footprint overall.

FIGS. 1 through 8 illustrate a system for generating aqueous ozone solution, in accordance with one or more embodiments of this disclosure. The system includes an ozone supply unit 100 configured to output ozone for creating an ORP in water and a structurally isolated mixing assembly 200 for in-line mixing of the ozone into the water in order to output a water and ozone solution. Although the system is discussed with regard to applications that employ water to generate a water and ozone solution, it is contemplated that the system may be configured to generate other types of ozonated fluid solutions for the purposes of cleansing, degreasing, decontaminating, and/or fluid treatment.

As shown in FIG. 1, the ozone supply unit 100 may include an ozone supply unit enclosure 102. In embodiments, a mixing assembly 200 is coupled to an exterior portion (e.g., mounted to an exterior sidewall) of the ozone supply unit enclosure 102. While the ozone supply unit enclosure 102 and mixing assembly 200 are separate structures, the ozone supply unit enclosure 102 and the mixing assembly 200 are still fluidically coupled by one or more tubes (e.g., flexible tubing, pipes, etc.) for transferring ozone from the ozone supply unit 100 to the mixing assembly 200. Furthermore, the mixing assembly 200 may be coupled (e.g., mounted or fastened) to an external sidewall of the ozone supply unit enclosure 102.

Figure 8:
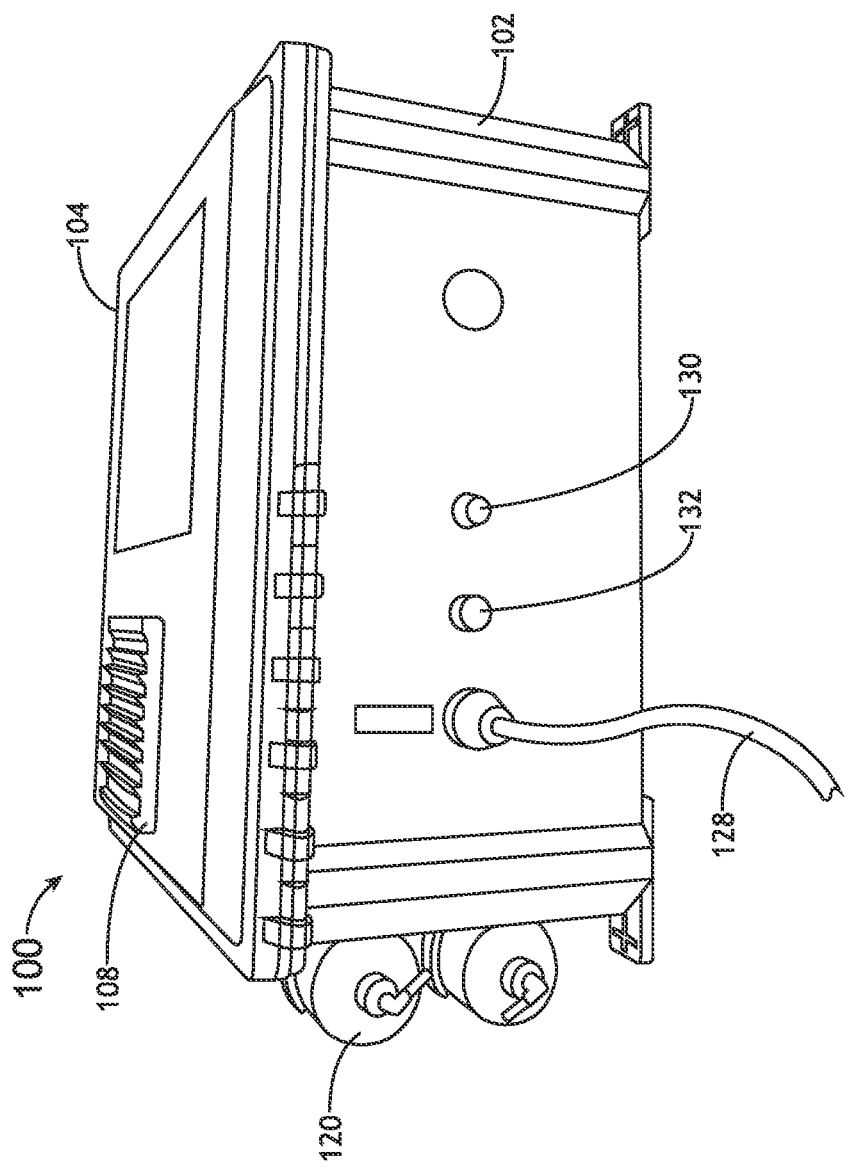
FIG. 8 is a left side view of the system illustrated in FIG. 1, in accordance with one or more embodiments of this disclosure.

The ozone supply unit enclosure 102 may have a securable lid/cover 104 that can enclose (e.g., when secured/closed) and provide access to (e.g., when removed/opened) the components housed in an interior portion of the ozone supply unit enclosure 102. As shown in FIG. 1, the securable lid/cover 104 may be secured to the ozone supply unit enclosure 102 by a hinge on one side and a latch or fastener on an opposing side. In other embodiments, the securable lid/cover 104 may be secured to the ozone supply unit enclosure 102 by one or more fasteners (e.g., screws to mate with bores in the ozone supply unit enclosure 102, latches, interference fit fasteners, clipping fasteners, magnetic fasteners, or the like). In some embodiments, the ozone supply unit 100 may have one or more vents (e.g., vents 106 and 108) in the ozone supply unit enclosure 102 and/or lid/cover 104 to let hot air (exhaust) out of the ozone supply unit 100 and/or let ambient air into the ozone supply unit 100 to prevent the internal components (e.g., ozone generators, controllers, relays, etc.) of the ozone supply unit 100 from overheating. As shown in FIG. 8, the ozone supply unit enclosure 102 may further include ports/openings for a power cable 128, a switch 130 to engage or disengage power to the ozone supply unit 100, an indicator 132 (e.g., a light source), or any combination thereof.

Figure 2:
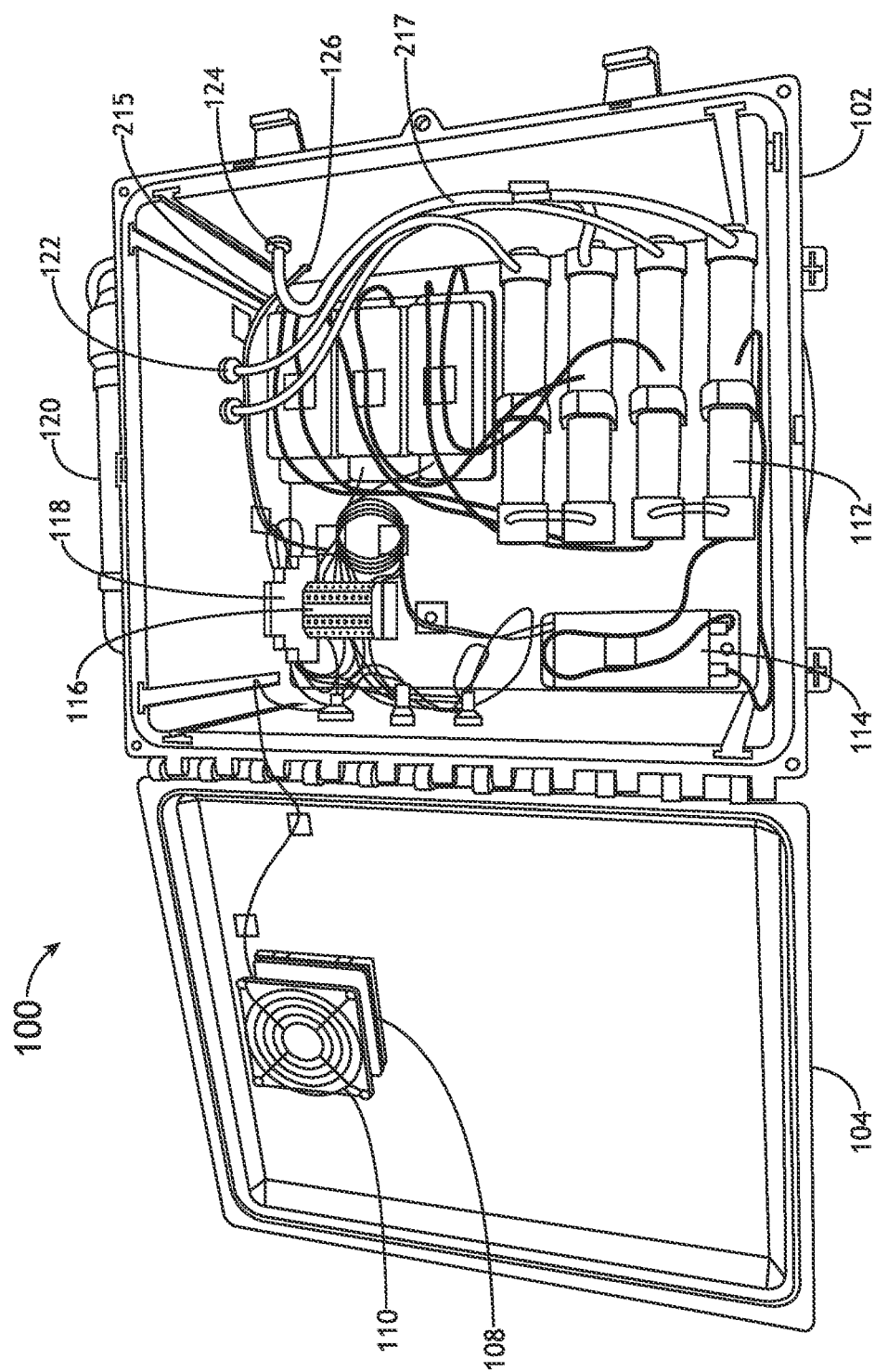
FIG. 2 is a perspective front view of the system illustrated in FIG. 1, wherein an ozone supply unit is opened up to show components that are contained within an ozone supply unit enclosure of the system, in accordance with one or more embodiments of this disclosure.
Figure 3:
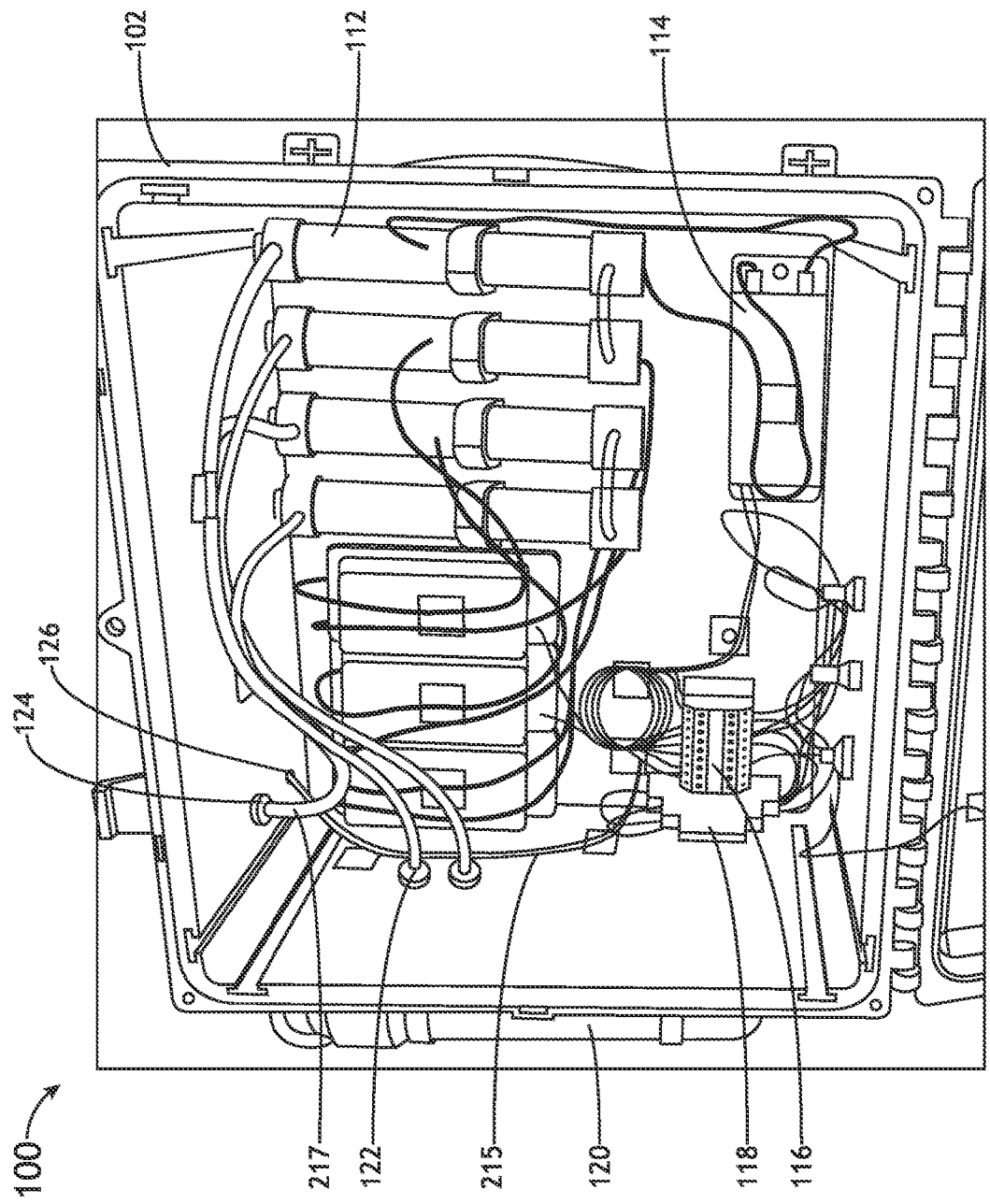
FIG. 3 is another perspective front view the system illustrated in FIG. 1, wherein the ozone supply unit is opened up to show the components contained within the ozone supply unit enclosure of the system, in accordance with one or more embodiments of this disclosure.

FIGS. 2 and 3 illustrate the ozone supply unit 100 with the lid/cover 104 opened or removed from the ozone supply unit enclosure 102, in accordance with one or more embodiments of this disclosure. As shown in FIG. 2, one or more of the vents (e.g., vent 108) may be coupled to an exhaust fan 110 configured to blow hot air out of the ozone supply unit 100 when the ozone supply unit 100 is running. As shown in FIG. 3, the ozone supply unit enclosure 102 includes one or more air intake ports 122 and one or more ozone output ports 124.

The ozone supply unit 100 includes a plurality of ozone generators 112 (e.g., four ozone generators 112) disposed within the ozone supply unit enclosure 102. The ozone generators 112 are fluidically coupled to the one or more air intake ports 122 and the one or more ozone output ports 124 of the ozone supply unit enclosure 102. One or more controllers 114 (e.g., four controllers 114) may also be disposed within the ozone supply unit enclosure 102. The one or more controllers 114 may be communicatively coupled to the ozone generators 112.

In embodiments, each of the ozone generators 112 may include a corona discharge tube configured to use oxygen supplied via the one or more air intake ports 122 to generate ozone, such as through splitting of oxygen molecules in the air through electrical discharge caused by supplying power to a dielectric material within the corona discharge tube. For example, each ozone generator 112 may include an input port that is fluidically coupled to an air intake port 122 and to convert oxygen from incoming air into ozone. The ozone generators 112 may be powered by a power source 118 (e.g., a 120V/240V power supply coupled to the power cable 128). A power signal from power source 118 may be transformed via a transformer suitable for applying the voltage to the dielectric within the corona discharge tube of the ozone generator 112. For example, a transformer may be coupled to or integrated within a controller 114 for each ozone generator 112 or one controller 114 that controls a plurality of ozone generators 112. In some embodiments, each controller 114 includes a logic circuit (e.g., processor) that is programmed to selectively activate or deactivate one or more connected ozone generators 112. In other embodiments, each controller 114 is a transformer that passively activates one or more connected ozone generators 112 when power is supplied to the controller 114 and deactivates the one or more connected ozone generators 112 when the controller 114 is disconnected from power. The ozone supply unit 100 may include a relay 116 (e.g., a switchboard with analog or digital logic circuits) that controls distribution of power and/or communication signals withing the ozone supply unit 100. For example, the relay 116 may be connected to the power source 118, the power switch 130, the indicator 132, the one or more controllers 114 and/or ozone generators 112, and any sensors/switches (e.g., flow switch 214) of the system.

In some embodiments, the ozone generators 112 may be operated at 110 volts/60 Hz and have an operating frequency of about 450 kHz and 550 kHz, with a power rating of less than about 15 watts, and with a unit performance for electrical consumption of about 32 watts. For example, the ozone generators 112 may have an operating frequency of about 480 kHz. Further, the ozone generators 112 can be provided according to ISO 9001 CE standards.

Each of the ozone generators 112 may be configured to produce from about 800 mg ozone per hour to about 1200 mg ozone per hour, although other ranges may be appropriate depending on the application. In some embodiments, each of the ozone generators 112 produces about 1000 mg ozone per hour. The ozone generators 112 may include other methods and systems for generating ozone, including but not limited to, electrochemical cells configured to generate ozone from water by placing an anode and a cathode in contact with opposite sides of a proton exchange membrane (PEM), and supplying power to the cell, whereby water flowing over the surface of the anode breaks down into hydrogen atoms and oxygen atoms that assemble to form $O_3$ (ozone).

Figure 7:
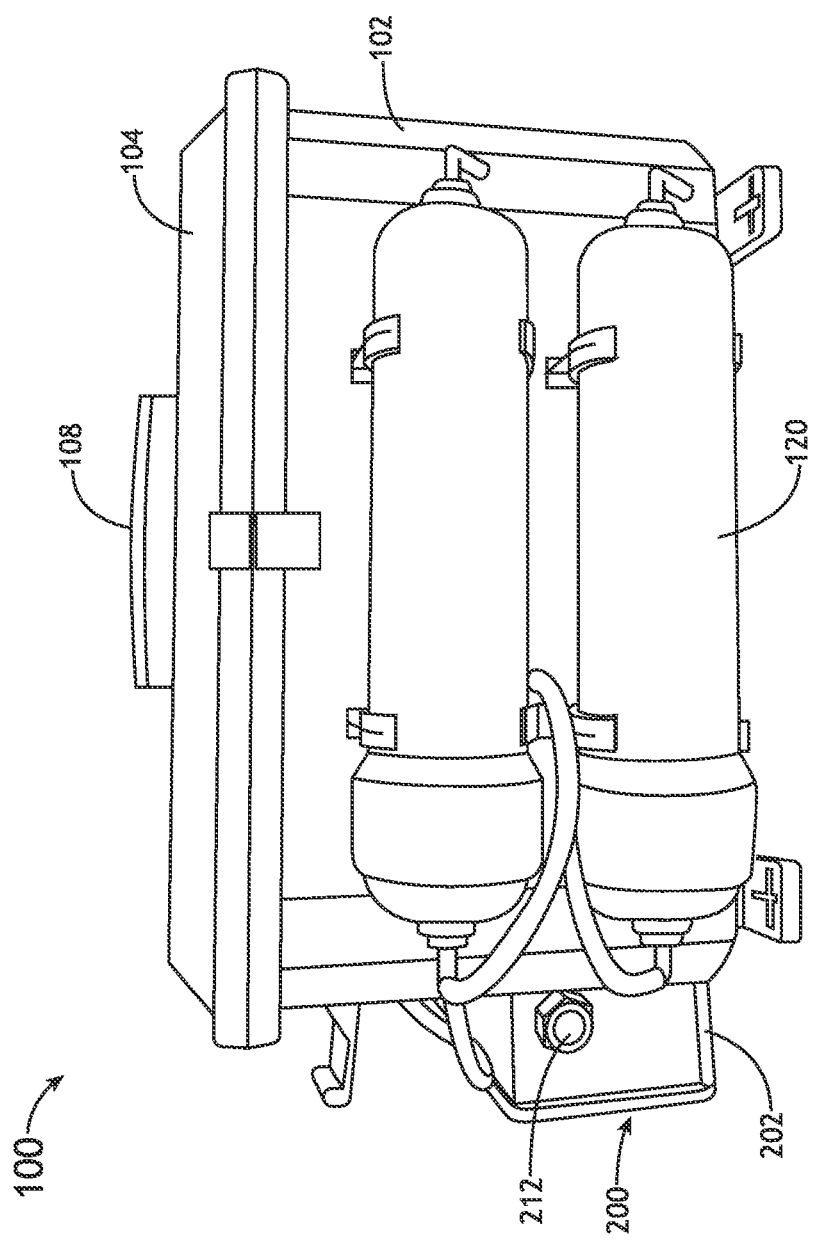
FIG. 7 is a top view of the system illustrated in FIG. 1, in accordance with one or more embodiments of this disclosure.

As shown in FIGS. 3 and 7, the ozone supply unit 100 may further include one or more air dryers 120 (or filters) (e.g., two air dryers 120), which may be externally coupled to the ozone supply unit enclosure 102. The one or more air dryers 120 are configured to remove moisture from air before the air is supplied to the ozone generators 112 through the one or more air intake ports 122. The one or more air dryers 120 may be configured to dry the air to a minus dew point by removing water vapor or moisture therefrom, where the water could inhibit the production of ozone by the ozone generators 112.

In some embodiments, the system may further include an oxygen concentrator configured to supply oxygen-enriched air to the one or more air intake ports 124 of the ozone supply unit 100. For example, the oxygen concentrator may be configured to direct the oxygen-enriched air through the one or more air dryers 120. The oxygen concentrator may also remove moisture from the air. In this regard, the incoming air may undergo two drying stages. The oxygen concentrator may be fluidically coupled to the ozone supply unit 100 (e.g., to the one or more air dryers 120 and/or one or more air intake ports 122) by one or more tubes (e.g., flexible tubing, pipes, etc.) for transferring oxygen-enriched air from the oxygen concentrator to the ozone supply unit 100.

In some embodiments, each air dryer 120 includes or is coupled to an air compressor. The pressure provided by the compressor can vary depending on the water pressure supplied to the system, where the pressure applied by the compressor can be balanced based on the flow rate of air received by the ozone generators 112 via the one or more air intake ports 122 and the water pressure supplied to the system to obtain a particular ORP of the water. For example, the compressor may be configured to compress the filtered air at least about 15 KPa (e.g., more particularly at a pressure of 18 KPa or about 2.6 psi) to provide a gas throughput in each ozone generator 112 of about 8 SCFH (standard cubic feet per hour), where the water pressure in each fluid path is about 50 psi to 55 psi (e.g., a reasonable rating for many residential and commercial facilities), to provide an ORP in the water at the aqueous ozone solution output port of at least about 600 mV (e.g., about 600 mV to about 1000 mV, more particularly about 700 mV to about 900 mV). At these pressures, each ozone generator 112 may have a residence time of the gas of about three seconds. The pressure applied by the compressor can affect the rate at which the gas flows through an ozone generator 112, which can affect contact time of the air with the components of the ozone generator 112, which can also affect mass gas transfer rates within the ozone generator 112.

The ozone supply unit 100 may include a plurality of ozone generators 112. For example, in an embodiment illustrated FIG. 2, the ozone supply unit 100 includes four ozone generators 112. At least two of the ozone generators 112 may be fluidically connected in parallel between the one or more air intake ports 122 and the one or more ozone output ports 124. For example, in the embodiment illustrated in FIG. 3, a first set of ozone generators 112 (in series) and a second set of ozone generators 112 (in series) are connected in parallel between the air intake ports 122 and the ozone output port 124. In some embodiments, one or more splitters/combiners are used to fluidically couple each pair/set of ozone generators 112 in parallel with another pair/set of ozone generators 112.

The ozone supply unit 100 may also include two or more ozone generators 112 connected in series with one other. For example, in the embodiment illustrated in FIG. 3, a first set of ozone generators 112 are connected together in series, and a second set of ozone generators 112 are also connected together in series. Such configurations may provide increased ozone output and/or backup ozone generators 112 in case of malfunction or inoperability of one or more of the other ozone generators 112. On average, each ozone generator 112 may have an operating life of about 10,000 working hours.

Figure 4:
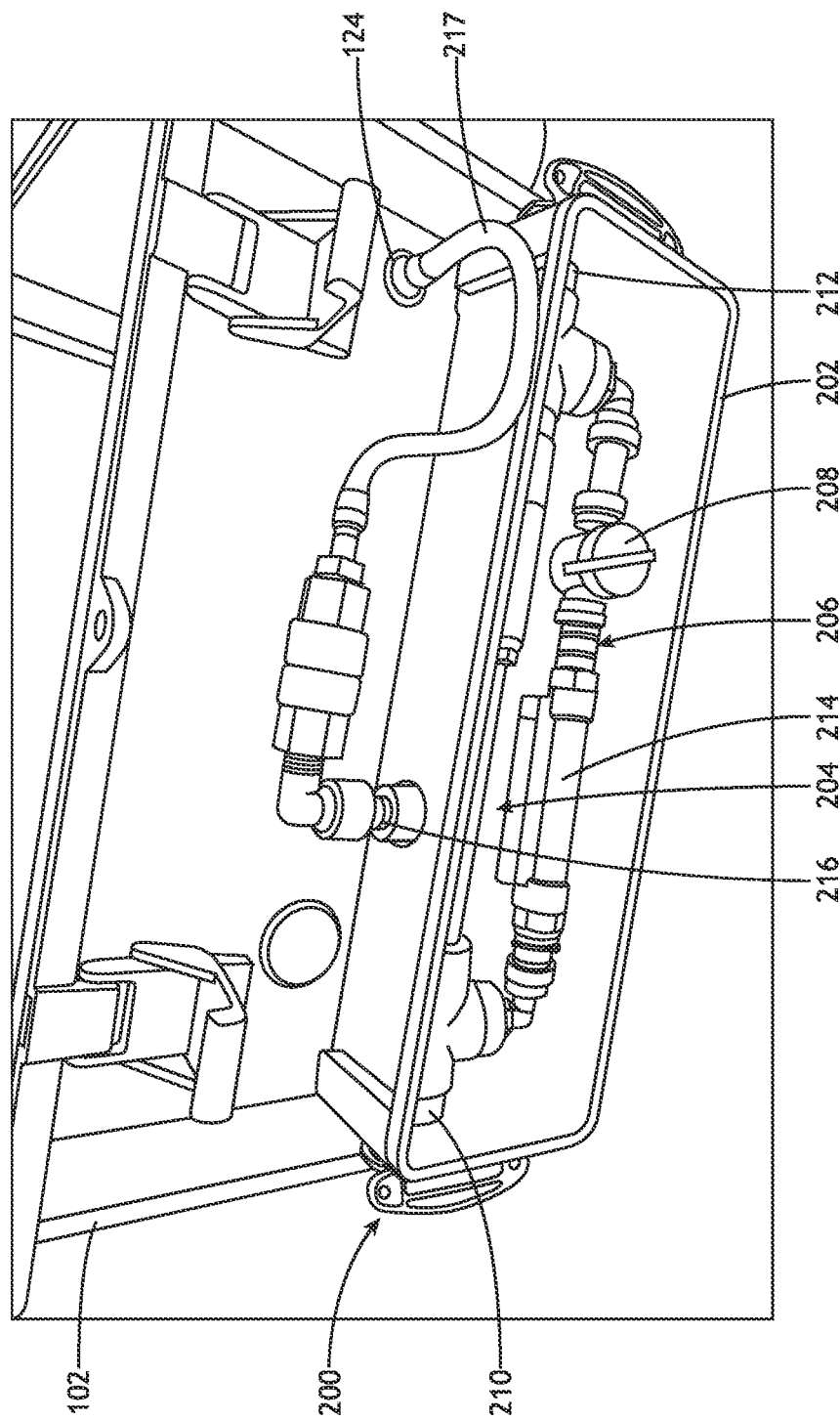
FIG. 4 is a perspective right side view of the system illustrated in FIG. 1, showing an auxiliary compartment coupled to an external sidewall of the ozone supply unit enclosure, wherein the auxiliary compartment includes a mixing assembly that is fluidically and electronically coupled to the components contained within the ozone supply unit enclosure of the system, in accordance with one or more embodiments of this disclosure.
Figure 5:
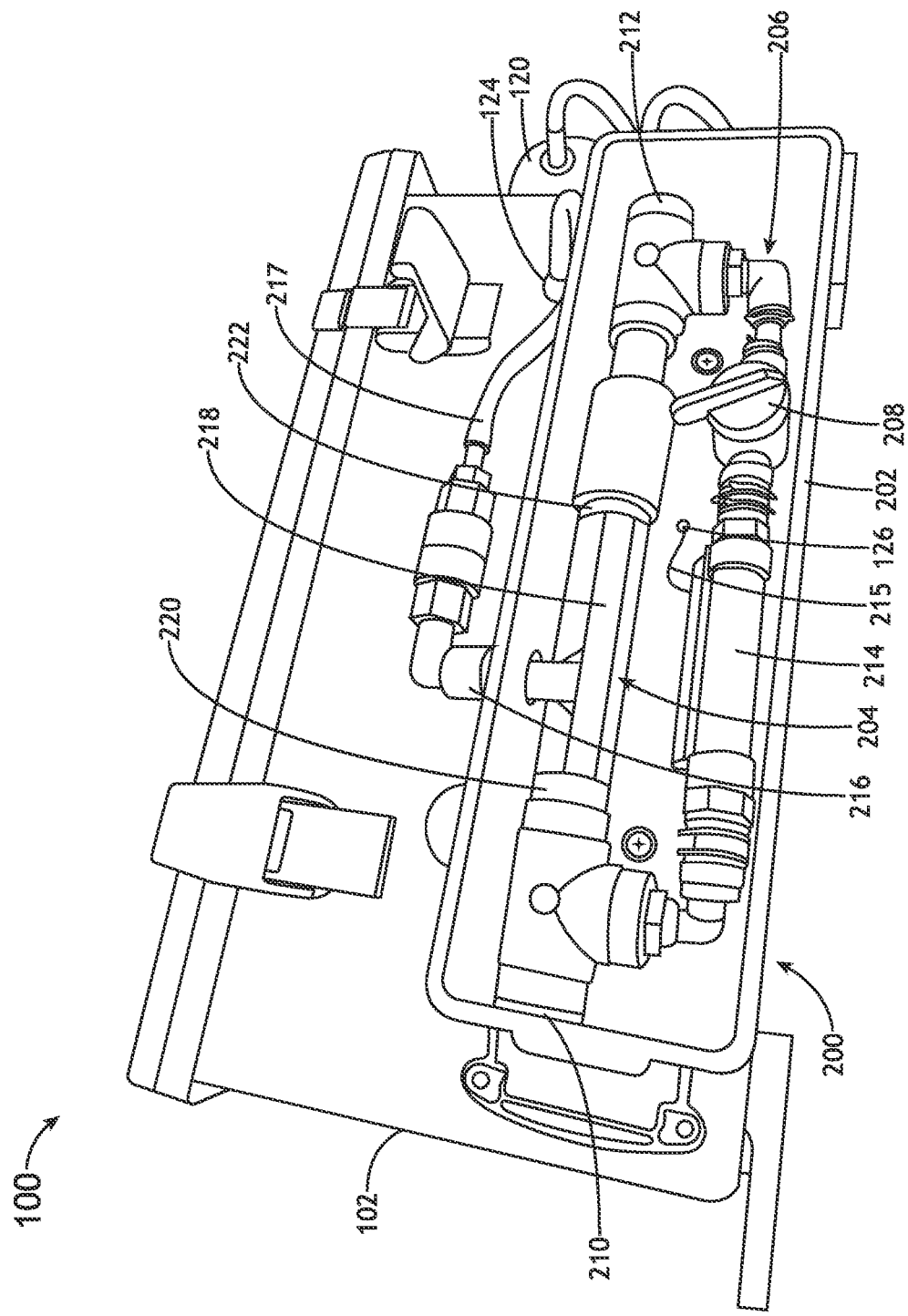
FIG. 5 is another perspective right side view of the system illustrated in FIG. 1, showing the auxiliary compartment (containing the mixing assembly) coupled to the external sidewall of the ozone supply unit enclosure, in accordance with one or more embodiments of this disclosure.
Figure 6:
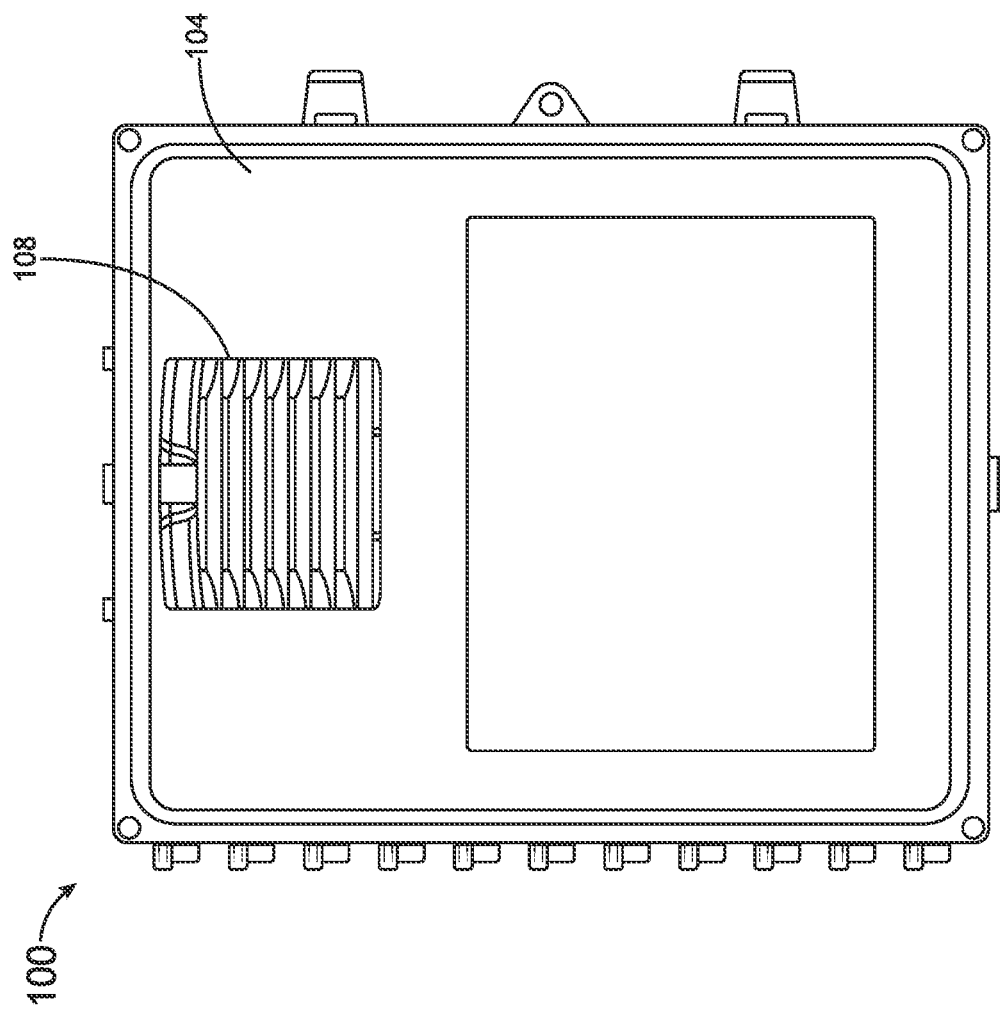
FIG. 6 is a front view of the system illustrated in FIG. 1, in accordance with one or more embodiments of this disclosure.

FIGS. 4 and 5 illustrate the mixing assembly 200, in accordance with one or more embodiments of this disclosure. As shown in FIG. 5, the mixing assembly 200 includes a first flow path 204 for water to flow through. The first flow path 204 may include one or more pipe segments and/or fittings that define a first fluid pathway between a water input port 210 and an aqueous ozone solution output port 212 of the mixing assembly 200. The first flow path 204 includes one or more ozone intake ports 216 that are fluidically coupled to the one or more ozone output ports 124 of the ozone supply unit enclosure 102. In embodiments, one or more ozone intake ports 216 of the mixing assembly 200 are fluidically coupled to the one or more ozone output ports 124 of the ozone supply unit 100 by one or more tubes 217 (e.g., flexible tubing, pipes, etc.) for transferring ozone from the ozone supply unit 100 to the mixing assembly 200.

The mixing assembly 200 further includes a second flow path 206 fluidically coupled in parallel with the first flow path 204. For example, the second flow path 206 includes one or more pipe segments and/or fittings that define a second fluid pathway in parallel with the first fluid pathway (first flow path 204) between the water input port 210 and the aqueous ozone solution output port 212 of the mixing assembly 200. The second flow path 206 may form a D or P shaped branch out of the first flow path 204. This structural arrangement may help maintain more water flow through the first flow path 204 than the second flow path 206.

The second flow path 206 includes a control valve 208 that is configured to selectively permit (or restrict) water flow through the second flow path 206. When the control valve 208 is opened to permit a portion of the water to flow through the second flow path 206, the fluid action produces a negative pressure in the first flow path 204. The negative pressure then causes ozone from the ozone supply unit 100 to be drawn into the first flow path 204 through the one or more ozone intake ports 216 and mixed into the water flowing through the first flow path 204. In some embodiments, the control valve 208 is adjustable to vary the negative pressure produced in the first flow path 204 in order to control an ozone concentration of the aqueous ozone solution output by the system. For example, the control valve 208 may be adjustable to control the flow rate of water through the second flow path 206 in order to increase/decrease suction through the one or more ozone intake ports 216. In some embodiments, the level of suction (and hence the ozone concentration of the resulting aqueous ozone solution) can be increased by increasing the flow rate of water through the second flow path 206; and similarly, the level of suction (and hence the ozone concentration of the resulting aqueous ozone solution) may be reduced by decreasing the flow rate of water through the second flow path 206. Some configurations may be reversed such that the level of suction (and hence the ozone concentration of the resulting aqueous ozone solution) can be increased by decreasing the flow rate of water through the second flow path 206, and the level of suction (and hence the ozone concentration of the resulting aqueous ozone solution) may be reduced by increasing the flow rate of water through the second flow path 206.

In embodiments, the first flow path 204 includes a fluid mixer 218 that is coupled to or integrated within the first flow path 204. For example, the fluid mixer 218 may be removably coupled between two pipe fittings (e.g., pipe fittings 220 and 222) to allow for easy removal or replacement of the fluid mixer 218 if needed. The fluid mixer 218 may be configured to introduce/inject ozone generated by the ozone generators 112 into the water flowing through the first flow path 204. For example, the fluid mixer 218 may include and/or may be fluidically coupled to the ozone intake port 216 and configured to inject at least a portion of the ozone received via the ozone intake port 216 into the water flowing through the first flow path 204.

The fluid mixer 218 may be a multi-port coupler including an inlet, an outlet, and an ozone input port (e.g., ozone intake port 216) between the inlet and the outlet. The multi-port coupler may simply be pipe/tube fittings with an ozone input port (e.g., ozone intake port 216) formed therein, 3-way pipe/tube fittings, or the like.

In some embodiments, the multi-port coupler includes a venturi. A venturi can include an injector venturi design (e.g., a "T" design), where the venturi is coupled between the water input port and the aqueous ozone solution output port, and where ozone is introduced to the venturi through another port (i.e., the ozone input port) positioned perpendicular to the flow path of the water (from the water input port to the aqueous ozone solution output port). During operation, ozone generated by the ozone generators 112 is drawn into the venturi and mixed with the water stream flowing from the water input port to the aqueous ozone solution output port. A pressure differential between the water input port and the aqueous ozone solution output port may serve to facilitate drawing the ozone into the venturi and to facilitate mixing of the ozone and the water. In some embodiments, a pressure differential greater than 20 psi inlet over outlet (e.g., at least a 20 psi difference between the water input port and the aqueous ozone solution output port, with pressure higher at the water input port) is provided to generate negative suction in the venturi to thereby draw in the generated ozone, while assuring the energy for water flow and pressure for operation of the venturi.

In order to further increase effectiveness of the mixing process delivered by the venturi, the water and ozone solution may pass through an in-line mixer coupled between the venturi and the aqueous ozone solution output port. In this regard, the fluid mixer 218 may include a combination of a venturi and an in-line mixer, or another type of multi-port coupler with an in-line mixer. The in-line mixer can facilitate further breaking or mixing of ozone bubbles already introduced to the water to generate a mixture (or solution) of water and substantially uniform-sized ozone bubbles. The small uniform-size ozone bubbles can adhere to each other to lower the surface tension of the water and ozone solution. For example, water can have a surface tension of about 72 Millinewtons, whereas the solution of water and substantially uniform-sized ozone bubbles can have a surface tension of about 48-58 Millinewtons. In embodiments, the in-line mixer has an internal diameter that equals an internal diameter of the output port of the venturi to which the in-line mixer is coupled. The same internal diameter can provide an uninterrupted transition of the fluid flowing from the venturi to the in-line mixer, such as to maintain a vortex action or mixing action of the water and the ozone bubbles. The in-line mixer also provides increased contact time between the water and ozone bubbles and can facilitate preparation of uniform ozone bubble size. In some embodiments, the in-line mixer has a length of about two inches downstream from the venturi, which can allow sufficient time for the velocity of the vortex action caused by the pressure differential of the venturi to crush the gaseous bubbles entrained in the solution into uniformed size bubbles. The in-line mixer can also reintroduce undissolved gas back into the solution resulting in increased efficiency as well as reduced off-gas at the point of application. The in-line mixer can include multiple chambers through which the water and ozone solution flows. The size of the chambers can be determined based on the water flow (e.g., throughput), gas mixing, and desired time exposure. In some embodiments, operation of the system produces a water stream at the aqueous ozone solution output port having a molar concentration of ozone of at least 20%, or more particularly at least 25%, far surpassing previous systems that have mass gas transfer rates of less than 10%.

In some embodiments, the mixing assembly 200 is contained within an auxiliary compartment 202. As shown in FIG. 1, the auxiliary compartment 202 may be coupled to an external sidewall of the ozone supply unit enclosure 102. For example, in the embodiment illustrated in FIG. 5, a base of the auxiliary compartment 202 is mounted to the external sidewall of the ozone supply unit enclosure 102 by one or more fasteners (e.g., screws, bolts, etc.). In other embodiments, the auxiliary compartment 202 may be molded or adhered to the external sidewall of the ozone supply unit enclosure 102.

The auxiliary compartment 202 includes a plurality of openings including, but not limited to: a first opening for the water input port 210, a second opening for the aqueous ozone solution output port 212, and a third opening for the one or more ozone intake ports 216. In some embodiments, the first and second openings for the water input port 210 and the aqueous ozone solution output port 212, respectively, are directly across from one another on opposite ends of the auxiliary compartment 202. The third opening (or openings) for the one or more ozone intake ports 216 may be located on a surface of the auxiliary compartment 202 that is perpendicular to the opposite ends of the auxiliary compartment 202 that include the first and second openings.

The auxiliary compartment 202 may further have a securable lid/cover (not shown) that encloses the flow paths 204 and 206 of the mixing assembly 200 within the auxiliary compartment 202 when it is secured and provides access to the flow paths 204 and 206 of the mixing assembly 200 when it is removed. The securable lid/cover may be secured to the auxiliary compartment 202 by one or more fasteners (e.g., screws to mate with bores in the auxiliary compartment 202, latches, interference fit fasteners, clipping fasteners, magnetic fasteners, or the like). In other embodiments, the securable lid/cover may be secured by a hinge on one side and a latch or fastener on an opposing side.

The ozone supply unit 100 may be communicatively coupled to a flow switch 214 configured to detect water flow through a fluid pathway of the system. As shown in FIG. 5, the flow switch 214 may be coupled to or integrated within the second flow path 206. For example, the flow switch 214 may be fluidically coupled between the control valve 208 and either of the water input port 210 or the aqueous ozone solution output port 212. In some embodiments, the water input port 210 and the aqueous ozone solution output port 212 are located on opposite sides of the auxiliary compartment 202, allowing for a linear (e.g., horizontal/vertical) flow path through the auxiliary compartment 202. In other embodiments, the flow switch 214 may be external to the auxiliary compartment 202 and/or at a distance from the auxiliary compartment 202. For example, the flow switch 214 may be coupled to any of the fluid pathways for water flow through the system.

The flow switch 214 can be configured to provide electric signals indicative of water flow through the system (e.g., by sensing flow through the second flow path 206, or another fluid pathway in alternative embodiments). For example, the flow switch 214 may be a mechanical flow switch/sensor, electromagnetic flow switch/sensor, pressure-based flow switch/sensor, optical flow switch/sensor, or the like, configured to provide an electric signal indicative of a flow of fluid (e.g., water) through the system. In some embodiments, the flow switch 214 may be a solenoid-based flow switch/sensor, such as to avoid significant restriction of flow through the system.

In embodiments, the flow switch 214 is configured to transmit one or more control signals to the one or more controllers 114 in response to sensing a flow of water through the system (e.g., through the second flow path 206, or another fluid pathway in alternative embodiments). In response to receiving the one or more control signals, the one or more controllers 114 are configured to cause the ozone generators 112 to generate ozone. In some embodiments, the controllers 114 are transformers that become activated by control signals (e.g., status/power signals) transmitted by the flow switch 214 in response to sensing a flow of water. In other embodiments, the controllers 114 may further include microprocessors, microcontrollers, or other programmable logic devices. In such embodiments, the one or more controllers 114 may be configured (e.g., programmed) to activate the transformers and/or ozone generators 112 in response to the control signals (e.g., status signals) and possibly based on other sensor signals being monitored by the one or more controllers 114.

The flow switch 214 may be communicatively coupled to the one or more controllers 114 by one or more connectors 215 (e.g., wires, cables, optical fibers, etc.) for transmitting signals between the flow switch 214 and the one or more controllers 114. For example, as shown in FIG. 5, the flow switch 214 may be communicatively coupled to the ozone supply unit 100 by one or more connectors 215 that are fed through or connected to an opening/port 126 in the ozone supply unit enclosure 102. In some embodiments, the opening/port 126 is formed through the base of the auxiliary compartment 202 and the sidewall of the ozone supply unit enclosure 102 that is adjacent to the base of the auxiliary compartment 202.

As discussed above, the ozone supply unit 100 may include a relay 116 that distributes the incoming signals to the one or more controllers 114. In embodiments, the flow switch 214 is communicatively coupled to the relay 116 by the one or more connectors 215. The relay 116 may be configured to transmit the control signals from the flow switch 214 to the controllers 114, whereby the controllers 114 are programmed to activate the ozone generators 112 in response to receiving one or more control signals indicating a flow of water through the system. Alternatively, the relay 116 itself may be configured to connect the controllers/transformers 114 to power (or to directly power the ozone generators 112 if controllers/transformers 114 are present) in response to receiving one or more control signals indicating a flow of water through the system. In further embodiments, the ozone supply unit 100 may include a wireless communication interface (e.g., wireless receivers, transmitters, and/or transceivers) for receiving signals from the flow switch 214. For example, the flow switch 214 and one or more of the controllers 114 and/or relay 116 may include wireless communication interfaces for sending/receiving wireless communication/control signals.

The system may be configured to dispense water and ozone solution to provide water having an ORP of between 600 mV and 1000 mV to provide pathogenic control without introduction of harsh treatment chemicals, such as chlorine. After operation of the system, the output water and ozone solution can provide removal of organic and inorganic compounds, can provide removal of micro-pollutants (e.g., pesticides), can provide enhancement of the flocculation/coagulation decantation process, can provide enhanced disinfection while reducing disinfection by-products, can provide odor and taste elimination of the treated water, and so forth. The solubility of ozone in water is quite good, about 10 to 15 times greater than for oxygen under normal drinking water treatment conditions. About 0.1 to 0.6 liters of ozone will dissolve in one liter of water. The size of the ozone gas bubble in the system can influence gas transfer characteristics. In some embodiments, the mixing assembly 200 generates an ozone bubble size of about 2 to about 3 microns. For instance, micro-bubbles can be produced mixing assembly 200 and/or sheared into uniformed micro-size bubbles as the solution passes through the fluid pathways.

Corona discharge ozone can be used virtually anywhere. Since ozone is made on site, as needed and where needed, there is no need to ship, store, handle or dispose of it, nor any containers associated with shipping, storing, handling, and disposing a treatment chemical, as is the situation with most chemicals utilized in water treatment.

The system may be configured to provide indications pertaining to the operation status of the system, such as to ensure proper operation, or to provide an indication regarding a need for adjustment, servicing, or maintenance. For example, the flow switch 214 may be configured to send the signal to the indicator 132 that provides a visual, tactile, or audible indication that the fluid (e.g., water) is flowing through the system. In some embodiments, the indicator 132 is a light source (e.g., an LED) configured to illuminate upon receiving a signal from the flow switches. The indicator 132 may also be coupled to a sensor (e.g., a relay) configured to measure that a voltage is applied to ozone generators 112. When a proper voltage is applied to the ozone generators 112, the sensor can send a signal to the indicator. In some embodiments, the indicator 132 will provide a visual, tactile, or audible indication when each sensor and the flow switch 214 provide their respective signals to the indicator 132. For example, the relay 116 can be coupled to the power source 118 and the flow switch 214. The relay 116 may be configured to send an activation signal to the indicator 132 when the power source 118 is providing power to the ozone generators 112 and when the flow switch 214 provides one or more signals regarding fluid flow through the system. In such a configuration, the indicator 132 can verify that the system is operating under design conditions (e.g., having an active flow of water, and having a sufficient power supply to the ozone generators 112).

In some embodiments, the system may include an in-line ORP meter (e.g., ORP sensor and monitor) positioned to measure the ORP of the water and ozone solution, such as adjacent a water inlet, water/solution outlet, coupled within a distribution line, or the like. The in-line ORP meter can be coupled with the relay 116, such that the in-line ORP meter provides a signal to the relay 116 upon detection of a desired ORP or range of ORPs (e.g., at least 600 mV, at least 650 mV, at least 700 mV, at least 750 mV, at least 800 mV, at least 850 mV, at least 900 mV, at least 950 mV, etc.). The relay 116 can then provide an activation signal to the indicator 132 upon proper functioning of the system (e.g., when the power source 118 is providing power to the ozone generators 112, when the flow switch 214 provides one or more signals regarding fluid flow through the system, and when the in-line ORP meter detects a desired ORP of the water and ozone solution generated by the system). When the indicator 132 is not activated, this can provide an indication that a component or components of the system may need adjustment, servicing, or maintenance. Alternatively, the system can be configured to activate the indicator 132 upon failure of one or more of the components of the system (e.g., no power supplied to the ozone generators 112, no flow of water detected by the flow switch 214, or an out of range ORP detected by the in-line ORP meter).

By providing an ORP of between 600 mV and 1000 mV with the system, the output water and ozone solution can be utilized to destroy various pathogens, including, but not limited to, algae (e.g., blue-green), bacteria (e.g., *Aeromonas* & Actinomycetes, *Bacillus*, Campylobacters, *Clostridium botulinum*, *Escherichia coli* (*E. coli*), *Flavobacterium*, *Helicobacter* (*pylori*), Heterotrophic Bacteria, *Legionella pneumophila*, *Micrococcus*, *Mycobacterium tuberculosis*, *Pseudomonas aeruginosa*, *Salmonella*, *Shigella* shigellosis (dysentery), *Staphylococcus* sp, *albus*, *aureus*, *Streptococcus*, *Vibrio: alginolyticus, anguillarium, parahemolyticus, Yersinia enterocolitica*), fungi, molds, yeasts, mold spores, nematodes, protozoa (e.g., *Acanthamoeba & Naegleria, Amoeboe Trophozoites, Cryptosporidium, Cyclospora, Entamobea* (*histolytica*), *Giardia lamblia, Giardia muris, Microsporidium, N. gruberi*), trematodes, viruses (e.g., Adenovirus, Astrovirus, Cailcivirus, Echovirus, Encephalomyocarditis, Enterovirus, coxsachie, poliovirus, Hepatitis A, B and C, Myxovirus influenza, Norwalk, Picobirnavirus, Reovirus, Rotavirus).

The water in the water and ozone solution may have a surface tension of about 72 Millinewtons per meter at 20° C. as it enters the system. The system may be configured to reduce the surface tension of the water in the water and ozone solution to about 48-58 Millinewtons per meter at 20° C. The reduced surface tension of the water enables the water and ozone solution being sprayed onto the hard surfaces and equipment to remove grease more effectively from hard surfaces and equipment since ozonated fluid is more capable of loosening and disintegrating any biofilm on the hard surfaces or equipment. The reduced surface tension of the water in the water and ozone solution better enables the cleansing of the hard surfaces and equipment since it more easily penetrates foreign material on the hard surfaces and equipment.

In some implementations, the system may be used for water treatment or decontamination as described below.

Microbiological organisms/species can reside in water sources, including water intended for drinking recreation. Among the microbiological threats is the protozoan parasite—*cryptosporidium* (crypto). Crypto can be a particular challenge for the water treatment industry, however, ozone can eliminate it. Ozone, molecularly known as $O_3$, is a sanitizer and is relentless in its attack of organic microbes (bacteria, viruses, cysts, etc.). Through a process known as lysing, ozone breaks down cell walls or membranes, where it can then destroy the nucleus of the microbe. In addition to sanitation, ozone can provide for the oxidizing of inorganic material that could be present in water, such as metals (e.g., iron and manganese). Although there are a few stronger oxidizers, ozone is the strongest that is readily available for commercial or residential use. For example, ozone is about 1.5 times stronger than chlorine, and can provide a faster oxidizing action. Furthermore, because of this higher oxidation strength, ozone does not build up a tolerance to microbes unlike other sanitizers, such as chlorine. Within the microbial world protozoa, such as crypto, are some of the most resistant to all types of disinfectants. One reason for this resistance is due to its hard outer protective shell, which must be broken through prior to the microbe being inactivated. Crypto can cause a variety of ailments, including abdominal cramping, diarrhea, fever, and nausea that can last as long as a month, according to the Centers for Disease Control and Prevention (CDC). Disinfectants used to ward off *cryptosporidium* for water treatment applications can include chlorine (liquid state), chloramines, chlorine-dioxide (gaseous state), and ozone. However, their ability to perform this inactivation duty should not be regarded equal, as each sanitizer requires a specific level of concentration and contact time to take effect, as described by the following.

To better determine the specific amount of the disinfectant required to inactivate or destroy a microbe, the Environmental Protection Agency (EPA) has determined Ct Values. These Ct Values are the product of the disinfectant's concentration (C, expressed in mg/L) and the contact time (t, expressed in minutes). These Ct Values are calculated specifically to the percentage of microbial kill or better known as the log reduction, e.g., 1-Log=90.0 percent, 2-Log=99.0 percent or 3-Log=99.9 percent inactivation of the particular microbe. According to the EPA, chlorine dioxide would require a Ct of 226, which would correlate to 226 mg/L, at one minute of contact time, at 25° C. to achieve a 3-Log reduction or 99.9 percent inactivation. Although, ozone would only require a Ct of 7.4, correlating to 7.4 mg/L, to achieve the same 99.9 percent inactivation with the same parameters as chlorine dioxide. Ct is a product of concentration and time, and as such, both can be manipulated, as long as the given Ct Value is obtained for the desired log reduction (e.g., Ozone Ct of 7.4 can be achieved with a concentration 3.7 mg/L for two minutes of time).

*Cryptosporidium* outbreaks in public drinking waters and recreational swimming pools are becoming more and more of an evident issue. Unfortunately, forms of chlorine sanitation are not often the best solution, especially for high organic and inorganic contaminant levels, as they will create chlorine oxidation by-products, such as trihalomethanes (THM) and chloramine derivatives. These by-products are the typical cause of (what most associate as being over chlorinated) the chlorine smell in drinking or pool waters, and are the cause of itchy, smelly skin and burning eyes in pool water. Although with a properly sized system, ozone can be used as the primary sanitizing and oxidizing agent, oxidizing the contaminants completely. Using ozone in this manner would then allow chlorine to be used as the secondary residual sanitizer to satisfy regulatory requirements, without the production of chloramines and chlorine's side effects.

Further, ozone can be used to remove iron and manganese from water, forming a precipitate that can be filtered:

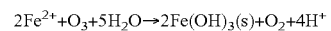

$$2Fe^{2+} + O_3 + 5H_2O \rightarrow 2Fe(OH)_3(s) + O_2 + 4H^+$$

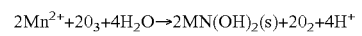

$$2Mn^{2+} + 2O_3 + 4H_2O \rightarrow 2MN(OH)_2(s) + 2O_2 + 4H^+$$

Ozone will also reduce dissolved hydrogen sulfide in water to sulfurous acid:

$$3O_3 + H_2S \rightarrow 3H_2SO_3 + 3O_2$$

The reactions involved iron, manganese, and hydrogen sulfide can be especially important in the use of ozone-based well water treatment. Further, ozone will also detoxify cyanides by converting the cyanides to cyanates (on the order of 1,000 times less toxic):

$$CN^- + O_3 \rightarrow CNO^- + O_2$$

Ozone will also completely decompose urea, where recent outbreaks of *E-coli* in lettuce have been impacted by urea:

$$(NH_2)_2CO + O_3 \rightarrow N_2 + CO_2 + 2H_2O$$

Ozonated fluids produced by the ozonated fluid dispensing system were analyzed. During the production of the ozonated fluid, oxygen is drawn in through an ambient air dryer with the drying capacity to supply sufficient oxygen at a minus dew point to the generating system, the generating system accumulates excess volume of high-quality gas, which is stalled or held in the chambers, thereby supplying a consistent maximum volume of gas resulting in an ample supply of gas to the injecting system, thereby assuring zero cavitation at the point of gas-liquid interface. The pressure differential created by the fluid mixing paths reduces the size of the bubbles to a uniformed size bubbles with a spherical geometry that are entrained in the water, thereby lowering the surface tension of the processed fluid. This process makes the fluid act like a surfactant and reduces the surface tension from 72 Millinewtons per meter at 20° C. to a tested surface tension of 48-58 Millinewtons equal to 140° F. or 60° C. hot water. At liquid-gas interfaces, surface tension results from the greater attraction of liquid molecules to each other due to cohesion than to the molecules in the gas due to adhesion. The net effect is an inward force at its surface that causes the liquid to behave as if its surface were covered with a stretched elastic membrane. Thus, the surface becomes under tension from the imbalanced forces, which is probably where the term "surface tension" came from. Because of the relatively high attraction of water molecules for each other through a web of hydrogen bonds, water has a higher surface tension (72.8 Millinewtons per meter at 20° C.) compared to that of most other liquids. Surface tension is an important factor in the phenomenon of capillary action.

In embodiments, the ozonated fluid dispensing system can be employed within any residential or commercial structure to supply water and ozone solution for cleansing, disinfecting, degreasing, and/or water treatment (e.g., water filtering, disinfecting, and/or softening). For example, the system may be configured to receive water from a water source (e.g., a conventional water main/supply line, or the like) through a water input line, mix the water with ozone, and dispense water and ozone solution through a water output line. The system may be used for a single application or a plurality of different applications. In residential or commercial applications, the system may be configured to supply ozonated water to a water heater or to various taps that receive water from a main water source (e.g., the main water line). In this regard, the system can be employed as a whole home or building water cleansing, disinfecting, degreasing, and/or water treatment solution. Alternatively, the system may be used for a particular zone of a residential or commercial building. In some cases, a plurality of systems can be used to ozonate water in a plurality of zones within a residential or commercial building.

The system can also be used for a variety of applications including, but not limited to: cleansing and/or degreasing hard surfaces such as plastic, glass, ceramic, porcelain, stainless steel, or the like; cleansing and/or degreasing equipment such as food service equipment such as ovens, ranges, fryers, grills, steam cookers, oven stacks, refrigerators, coolers, holding cabinets, cold food tables, worktables, ice machines, faucets, beverage dispensing equipment, beer dispensers, shelving food displays, dish washing equipment, grease traps, or the like; and/or cleansing and/or degreasing HVAC or plumbing systems such as roof top units, air scrubbers, humidifiers, water heaters, pumps, or the like.

Figure 9:
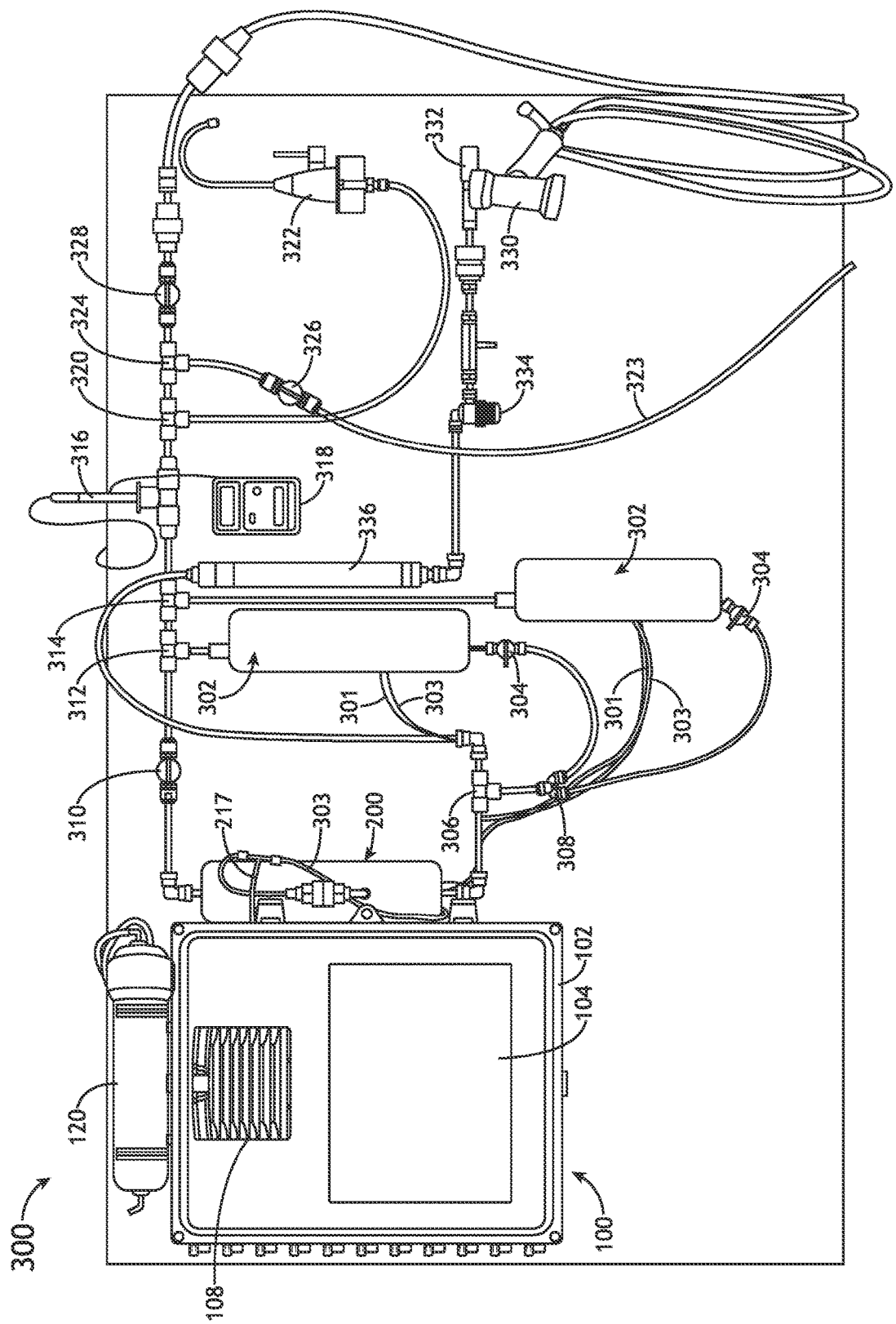
FIG. 9 is a front view of a system for generating aqueous ozone solution including an ozone supply unit with a network of auxiliary unit for supply aqueous ozone solution at different flow rates and/or to separate applications, in accordance with one or more embodiments of this disclosure.

Referring now to FIGS. 9 through 13, additional embodiments and configurations are disclosed. FIG. 9 illustrates a system 300 that includes the ozone supply unit 100 and a plurality of structurally isolated mixing assemblies (e.g., mixing assemblies 200 and 302) for in-line mixing of ozone into water in order to output a water and ozone solution.

Figure 11:
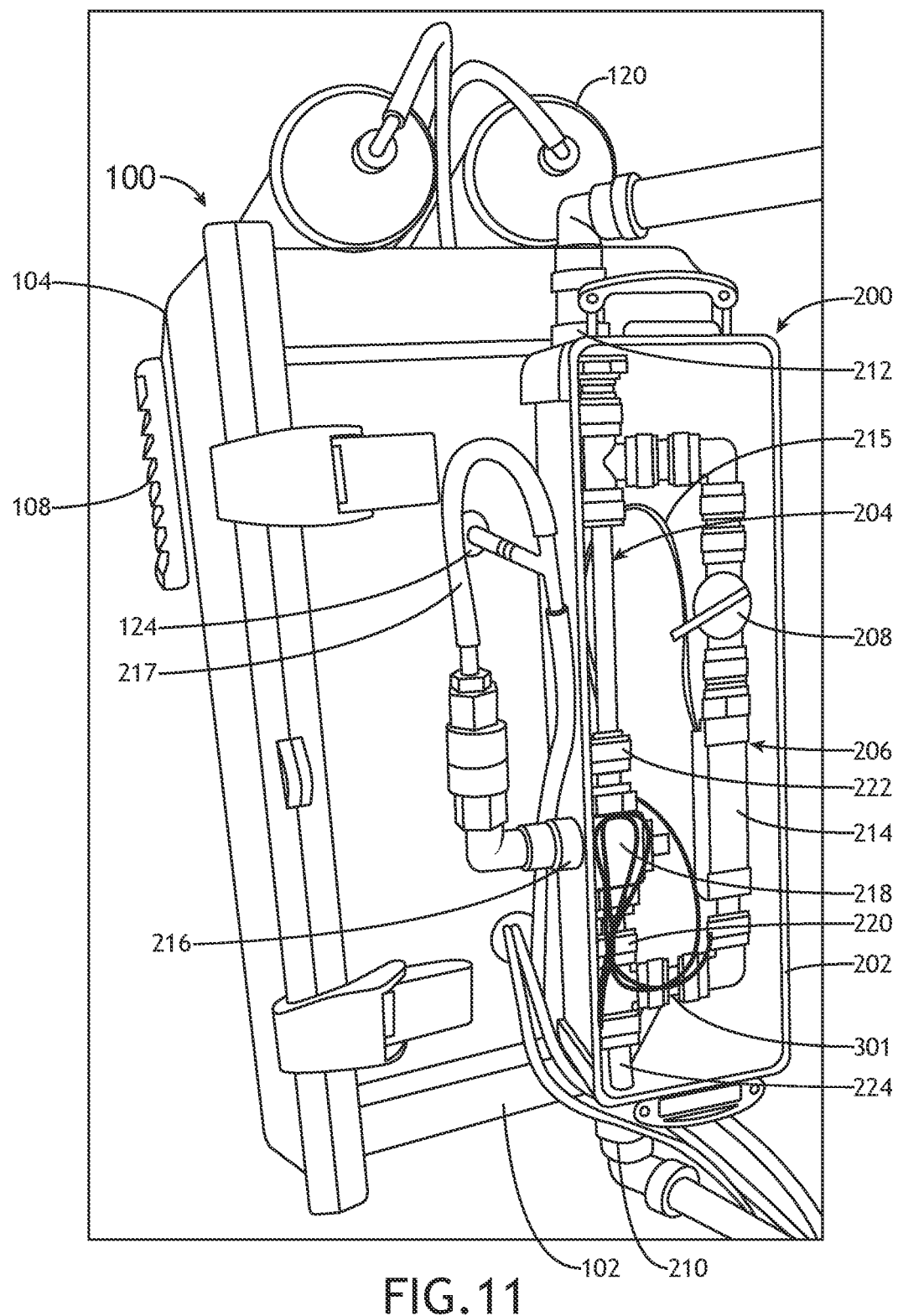
FIG. 11 is a perspective right side view of the ozone supply unit illustrated in FIG. 10, showing an auxiliary compartment coupled to an external sidewall of the ozone supply unit enclosure, wherein the auxiliary compartment includes a mixing assembly that is fluidically and electronically coupled to the components contained within the ozone supply unit enclosure of the system, in accordance with one or more embodiments of this disclosure.

In some embodiments, the system 300 includes a primary mixing assembly (i.e., mixing assembly 200) and one or more secondary mixing assemblies (e.g., mixing assemblies 302), all of which are fluidically and communicatively coupled to the ozone supply unit 100. For example, as shown in FIG. 11, the primary mixing assembly 200 may be mounted to an exterior portion of the ozone supply unit 100 and fluidically and communicatively connected to the ozone supply unit 100 in the same manner as described above with reference to FIGS. 1 through 8. Although, in some embodiments, the connections between the primary mixing assembly 200 and the ozone supply unit 100 may vary slightly (e.g., with different opening/port configurations and/or additional splitters, relays, or other intermediate components). Also, in some embodiments, the primary mixing assembly 200 may be detached from (not mounted to) the ozone supply unit 100.

Referring back to FIG. 9, the system 300 includes an input path that delivers water from a water source to a splitter 306 configured to distribute portions of the incoming water to respective water inlets of the primary and secondary mixing assemblies 200 and 302. When there are multiple secondary mixing assemblies 302, the system 300 may further include a second splitter 308, or splitter 306 may be 1-to-N splitter, where N is greater than 2. The input path may include, but is not limited to, a water inlet 332, sediment filter 334, and flowrate indicator 336.

In some embodiments, the water inlet of each of the secondary mixing assemblies 302 is coupled to a stop valve 304 for selectively permitting or preventing water flow through the secondary mixing assemblies 302. For example, to disable one of the secondary mixing assemblies 302, the respective stop valve 304 for that mixing assembly can be closed to prevent water from flowing through the mixing assembly, thereby preventing the mixing assembly from generating aqueous ozone solution. In alternative embodiments, the stop valves 304 may be coupled to the mixing assembly outlets or located within the mixing assemblies 302 while still functioning in the substantially the same way. Similarly, the primary mixing assembly 200 may also be coupled to a stop valve 310 for selectively permitting or preventing water flow through the primary mixing assembly 200.

The stop valves 304 and 310 may be used to selectively connect one or more of the mixing assemblies 200 and 302 to one or more output applications, i.e., by opening selected ones of the stop valves 304 and 310 to allow water flow through one or more of the mixing assemblies 200 and 302. For example, if stop valve 310 is open and stop valves 304 are closed, then only the primary mixing assembly 200 will be able to output aqueous ozone solution to an output path that leads to one or more output applications (e.g., faucet 322, fill/output line 323, spray gun 330, etc.). In another example configuration, if stop valve 310 and stop valves 304 are all open, then the primary mixing assembly 200 and the secondary mixing assemblies 302 will all be connected in parallel to the one or more output applications. This may result in an increased flow rate (e.g., total flow rate=primary mixing assembly flow rate+secondary mixing assembly flow rate+secondary mixing assembly flow rate). In yet another example configuration, if stop valve 310 is closed and stop valves 304 are open, then only the secondary mixing assemblies 302 will be connected in parallel to the one or more output applications. In this case, the total flow rate may equal the sum of the secondary mixing assembly flow rates. In yet another example configuration, if stop valve 310 is open and only one of stop valves 304 is open, then the primary mixing assembly and one of the secondary mixing assemblies 302 will be connected in parallel to the one or more output applications. In this case, the total flow rate may equal the sum of the primary mixing assembly flow rate and the (connected) secondary mixing assembly flow rate.

In some embodiments, the primary mixing assembly 200 and the secondary mixing assemblies 302 may have different flow rates. For example, the primary mixing assembly 200 may have a higher flow rate than the secondary mixing assemblies 302 (e.g., primary mixing assembly flow rate of 3 GPM and secondary mixing assembly flow rates of 1.5 GPM); accordingly, it may be possible to selectively connect one or more of the mixing assemblies 200 and 302 to the output path in order to achieve a desired flow rate (e.g., 1.5 GPM, 3 GPM, 4.5 GPM, or 6 GPM) from among the possible flow rates that can be output by a selected one of the mixing assemblies or by a selected combination of the mixing assemblies.

The system 300 may include an ORP monitor 318 configured to detect an ORP of the aqueous ozone solution supplied to the output path by selectively connected ones of the mixing assemblies 200 and 302. For example, as shown in FIG. 9, the output path may include an ORP sensor 316 for detecting an ORP of the aqueous ozone solution (e.g., water and ozone solution) being dispensed by selectively connected ones of the mixing assemblies 200 and 302, where the ORP monitor 318 is communicatively coupled to the ORP sensor 316 and configured to output an ORP value based on the sensor readings.

The output path may further include one or more splitters (e.g., splitters 320, 324, etc.) and stop valves (e.g., stop valves 326, 328, etc.) for selectively connecting the one or more output applications (e.g., faucet 322, fill/output line 323, spray gun 330, etc.) to the one or more selected ones of the mixing assemblies 200 and 302. For example, any selected one or combination of the mixing assemblies 200 and 302 (determined by configuring stop valves 304 and 310) may be connected to any selected one or combination of the output applications by configuring stop valves 326 and 328.

Figure 12:
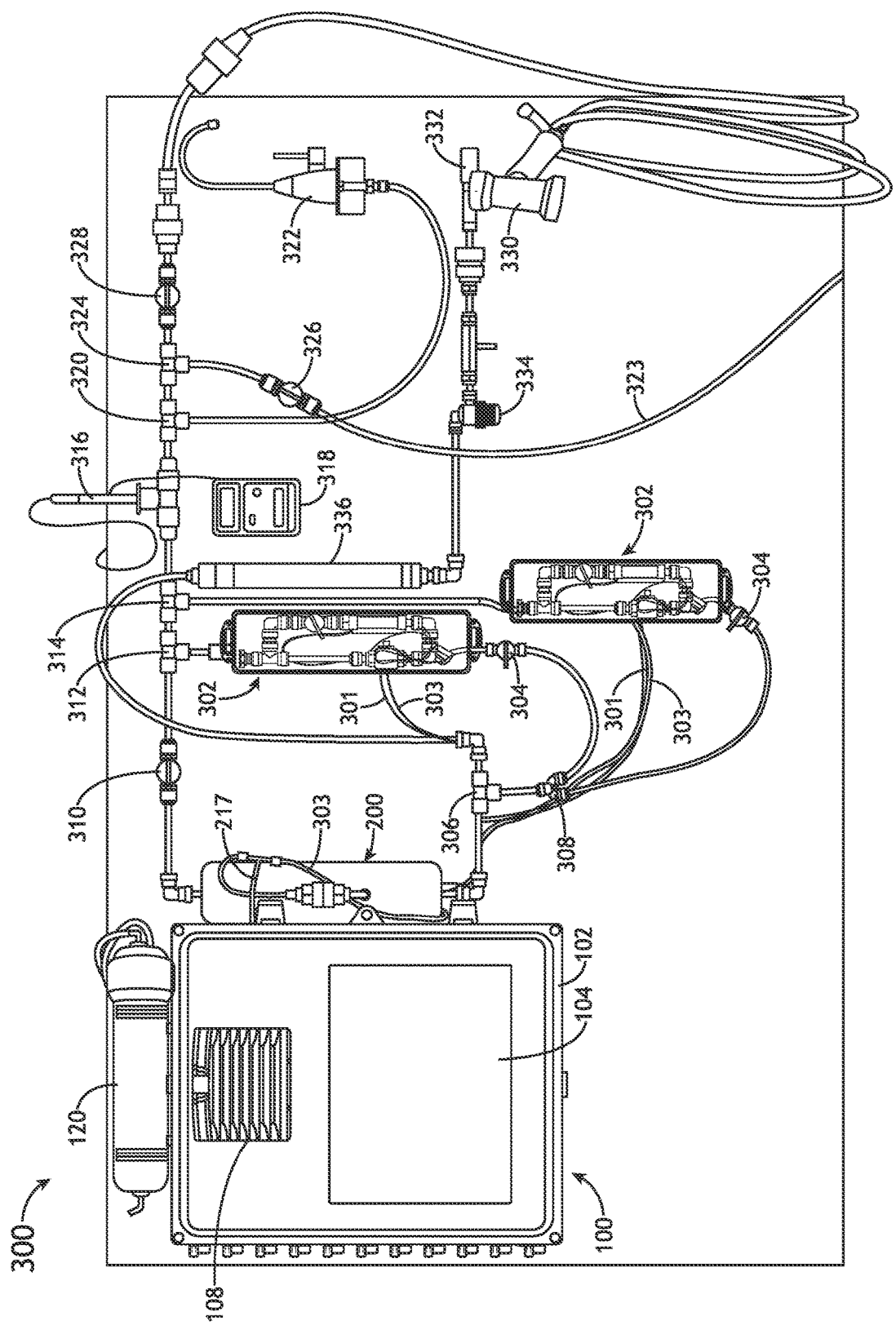
FIG. 12 is a front view of the system illustrated in FIG. 9, showing additional auxiliary compartments of the system opened up to show components that are contained within the additional auxiliary compartments, in accordance with one or more embodiments of this disclosure.
Figure 13:
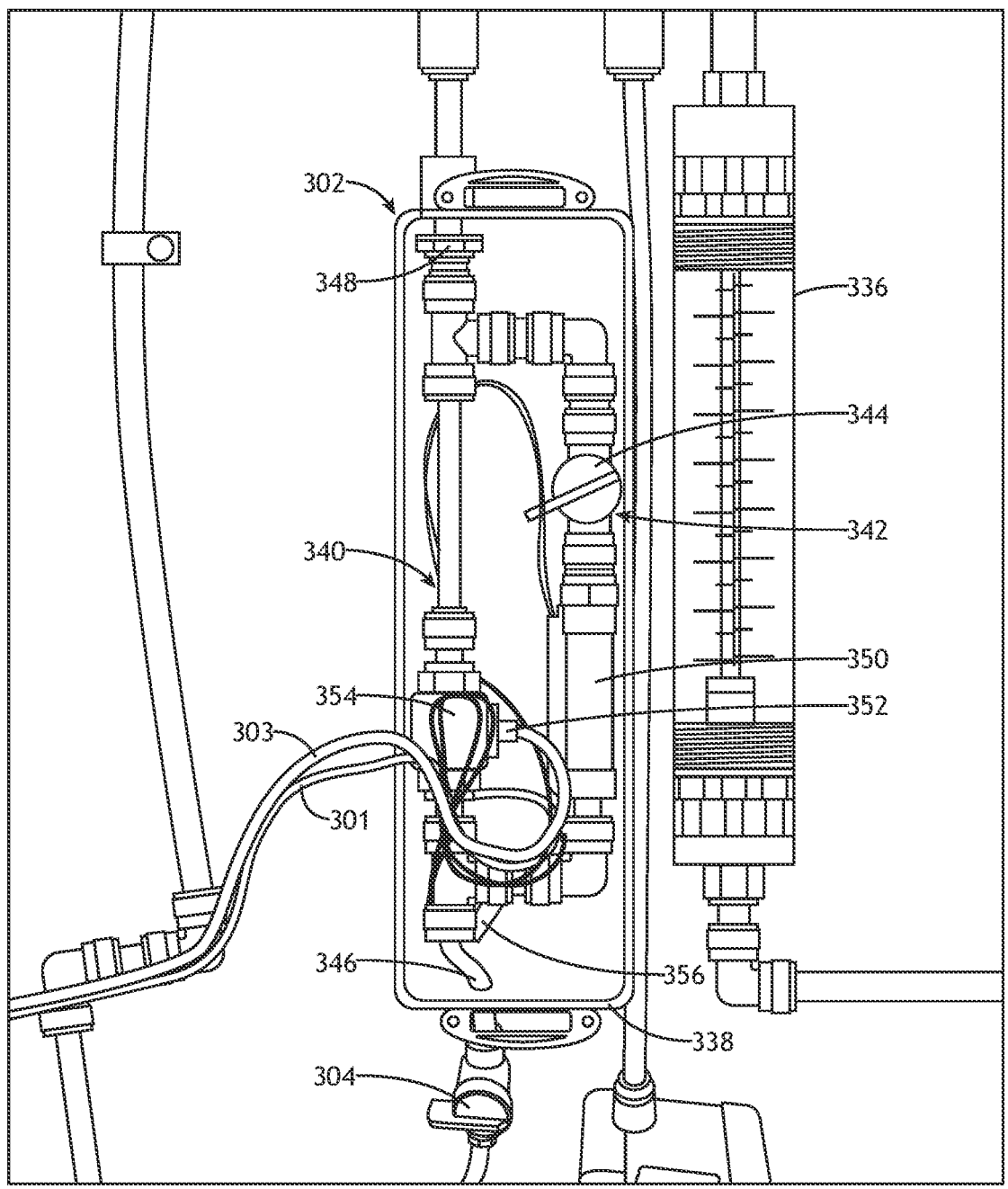
FIG. 13 is a perspective front view of one of the additional auxiliary compartments of the system illustrated in FIG. 12, wherein the auxiliary compartment includes a mixing assembly that is fluidically and electronically coupled to the components contained within the ozone supply unit enclosure of the system, in accordance with one or more embodiments of this disclosure.

As shown in FIGS. 12 and 13, the secondary mixing assemblies 302 may be structured very similarly to the primary mixing assembly 200. For example, as shown in FIG. 13, each of the secondary mixing assemblies 302 may include a first flow path 340 for water to flow through. The first flow path 340 may include one or more pipe segments and/or fittings that define a first fluid pathway between a water input port 346 and an aqueous ozone solution output port 348 of the secondary mixing assembly 302. The first flow path 304 includes one or more ozone intake ports 352 that are fluidically coupled to the one or more ozone output ports 124 of the ozone supply unit enclosure 102. In embodiments, one or more ozone intake ports 346 of the secondary mixing assembly 302 are fluidically coupled to the one or more ozone output ports 124 of the ozone supply unit 100 by one or more tubes 303 (e.g., flexible tubing, pipes, etc.) for transferring ozone from the ozone supply unit 100 to the secondary mixing assembly 302. As shown in FIG. 9, tubes 303 may be coupled to tubes 217 by one or more splitters.

The secondary mixing assembly 302 further includes a second flow path 342 fluidically coupled in parallel with the first flow path 340. For example, the second flow path 342 includes one or more pipe segments and/or fittings that define a second fluid pathway in parallel with the first fluid pathway (first flow path 340) between the water input port 346 and the aqueous ozone solution output port 348 of the secondary mixing assembly 302. The second flow path 342 may form a D or P shaped branch out of the first flow path 340. This structural arrangement may help maintain more water flow through the first flow path 340 than the second flow path 342.

The second flow path 342 includes a control valve 344 that is configured to selectively permit (or restrict) water flow through the second flow path 342. When the control valve 344 is opened to permit a portion of the water to flow through the second flow path 342, the fluid action produces a negative pressure in the first flow path 340. The negative pressure then causes ozone from the ozone supply unit 100 to be drawn into the first flow path 340 through the one or more ozone intake ports 352 and mixed into the water flowing through the first flow path 340. In some embodiments, the control valve 344 is adjustable to vary the negative pressure produced in the first flow path 340 in order to control an ozone concentration of the aqueous ozone solution output by the secondary mixing assembly 302. For example, the control valve 344 may be adjustable to control the flow rate of water through the second flow path 342 in order to increase/decrease suction through the one or more ozone intake ports 352. In some embodiments, the level of suction (and hence the ozone concentration of the resulting aqueous ozone solution) can be increased by increasing the flow rate of water through the second flow path 342; and similarly, the level of suction (and hence the ozone concentration of the resulting aqueous ozone solution) may be reduced by decreasing the flow rate of water through the second flow path 342. Some configurations may be reversed such that the level of suction (and hence the ozone concentration of the resulting aqueous ozone solution) can be increased by decreasing the flow rate of water through the second flow path 342, and the level of suction (and hence the ozone concentration of the resulting aqueous ozone solution) may be reduced by increasing the flow rate of water through the second flow path 342.

In embodiments, the first flow path 340 includes a fluid mixer 354 that is coupled to or integrated within the first flow path 340. For example, the fluid mixer 354 may be removably coupled between two pipe fittings to allow for easy removal or replacement of the fluid mixer 354 if needed. The fluid mixer 354 may be configured to introduce/inject ozone generated by the ozone generators 112 into the water flowing through the first flow path 340. For example, the fluid mixer 354 may include and/or may be fluidically coupled to the ozone intake port 352 and configured to inject at least a portion of the ozone received via the ozone intake port 352 into the water flowing through the first flow path 340.

The fluid mixer 354 may be a multi-port coupler including an inlet, an outlet, and an ozone input port (e.g., ozone intake port 352) between the inlet and the outlet. The multi-port coupler may simply be pipe/tube fittings with an ozone input port (e.g., ozone intake port 352) formed therein, 3-way pipe/tube fittings, or the like.

In some embodiments, the multi-port coupler includes a venturi. A venturi can include an injector venturi design (e.g., a "T" design), where the venturi is coupled between the water input port and the aqueous ozone solution output port, and where ozone is introduced to the venturi through another port (i.e., the ozone input port) positioned perpendicular to the flow path of the water (from the water input port to the aqueous ozone solution output port). During operation, ozone generated by the ozone generators 112 is drawn into the venturi and mixed with the water stream flowing from the water input port to the aqueous ozone solution output port. A pressure differential between the water input port and the aqueous ozone solution output port may serve to facilitate drawing the ozone into the venturi and to facilitate mixing of the ozone and the water. In some embodiments, a pressure differential greater than 20 psi inlet over outlet (e.g., at least a 20 psi difference between the water input port and the aqueous ozone solution output port, with pressure higher at the water input port) is provided to generate negative suction in the venturi to thereby draw in the generated ozone, while assuring the energy for water flow and pressure for operation of the venturi.

In order to further increase effectiveness of the mixing process delivered by the venturi, the water and ozone solution may pass through an in-line mixer coupled between the venturi and the aqueous ozone solution output port. In this regard, the fluid mixer 354 may include a combination of a venturi and an in-line mixer, or another type of multi-port coupler with an in-line mixer. The in-line mixer can facilitate further breaking or mixing of ozone bubbles already introduced to the water to generate a mixture (or solution) of water and substantially uniform-sized ozone bubbles. The small uniform-size ozone bubbles can adhere to each other to lower the surface tension of the water and ozone solution. For example, water can have a surface tension of about 72 Millinewtons, whereas the solution of water and substantially uniform-sized ozone bubbles can have a surface tension of about 48-58 Millinewtons. In embodiments, the in-line mixer has an internal diameter that equals an internal diameter of the output port of the venturi to which the in-line mixer is coupled. The same internal diameter can provide an uninterrupted transition of the fluid flowing from the venturi to the in-line mixer, such as to maintain a vortex action or mixing action of the water and the ozone bubbles. The in-line mixer also provides increased contact time between the water and ozone bubbles and can facilitate preparation of uniform ozone bubble size. In some embodiments, the in-line mixer has a length of about two inches downstream from the venturi, which can allow sufficient time for the velocity of the vortex action caused by the pressure differential of the venturi to crush the gaseous bubbles entrained in the solution into uniformed size bubbles. The in-line mixer can also reintroduce undissolved gas back into the solution resulting in increased efficiency as well as reduced off-gas at the point of application. The in-line mixer can include multiple chambers through which the water and ozone solution flows. The size of the chambers can be determined based on the water flow (e.g., throughput), gas mixing, and desired time exposure. In some embodiments, operation of the system produces a water stream at the aqueous ozone solution output port having a molar concentration of ozone of at least 20%, or more particularly at least 25%, far surpassing previous systems that have mass gas transfer rates of less than 10%.

In some embodiments, the secondary mixing assembly 302 is contained within an auxiliary compartment 338. The auxiliary compartment 338 includes a plurality of openings including, but not limited to: a first opening for the water input port 346, a second opening for the aqueous ozone solution output port 348, and a third opening for the one or more ozone intake ports 352. In some embodiments, the first and second openings for the water input port 346 and the aqueous ozone solution output port 348, respectively, are directly across from one another on opposite ends of the auxiliary compartment 338. The third opening (or openings) for the one or more ozone intake ports 352 may be located on a surface of the auxiliary compartment 338 that is perpendicular to the opposite ends of the auxiliary compartment 338 that include the first and second openings.

The auxiliary compartment 338 may further have a securable lid/cover (not shown in FIG. 13) that encloses the flow paths 340 and 342 of the secondary mixing assembly 302 within the auxiliary compartment 338 when it is secured and provides access to the flow paths 340 and 342 of the secondary mixing assembly 302 when it is removed. The securable lid/cover may be secured to the auxiliary compartment 338 by one or more fasteners (e.g., screws to mate with bores in the auxiliary compartment 338, latches, interference fit fasteners, clipping fasteners, magnetic fasteners, or the like). In other embodiments, the securable lid/cover may be secured by a hinge on one side and a latch or fastener on an opposing side.

The ozone supply unit 100 may be communicatively coupled to a flow switch 350 in the secondary mixing assembly 302 that is configured to detect water flow through the first flow path 340 or the second flow path 342. For example, as shown in FIG. 13, the flow switch 350 may be coupled to or integrated within the second flow path 342. In some embodiments, the flow switch 350 may be fluidically coupled between the control valve 344 and either of the water input port 346 or the aqueous ozone solution output port 348. In some embodiments, the water input port 346 and the aqueous ozone solution output port 348 are located on opposite sides of the auxiliary compartment 338, allowing for a linear (e.g., horizontal/vertical) flow path through the auxiliary compartment 338. In other embodiments, the flow switch 350 may be external to the auxiliary compartment 338 and/or at a distance from the auxiliary compartment 338. For example, the flow switch 350 may be externally coupled to the water input port 346 or the aqueous ozone solution output port 348 of the secondary mixing assembly 302.

The flow switch 350 can be configured to provide electric signals indicative of water flow through the system (e.g., by sensing flow through the second flow path 342, or another fluid pathway in alternative embodiments). For example, the flow switch 350 may be a mechanical flow switch/sensor, electromagnetic flow switch/sensor, pressure-based flow switch/sensor, optical flow switch/sensor, or the like, configured to provide an electric signal indicative of a flow of fluid (e.g., water) through the secondary mixing assembly 302. In some embodiments, the flow switch 350 may be a solenoid-based flow switch/sensor, such as to avoid significant restriction of flow through the secondary mixing assembly 302.

In embodiments, the flow switch 350 is configured to transmit one or more control signals to the one or more controllers 114 in response to sensing a flow of water through the system (e.g., through the second flow path 342, or another fluid pathway in alternative embodiments). In response to receiving the one or more control signals, the one or more controllers 114 are configured to cause the ozone generators 112 to generate ozone. In some embodiments, the controllers 114 are transformers that become activated by control signals (e.g., status/power signals) transmitted by the flow switch 350 in response to sensing a flow of water. In other embodiments, the controllers 114 may further include microprocessors, microcontrollers, or other programmable logic devices. In such embodiments, the one or more controllers 114 may be configured (e.g., programmed) to activate the transformers and/or ozone generators 112 in response to the control signals (e.g., status signals) and possibly based on other sensor signals being monitored by the one or more controllers 114.

Figure 10:
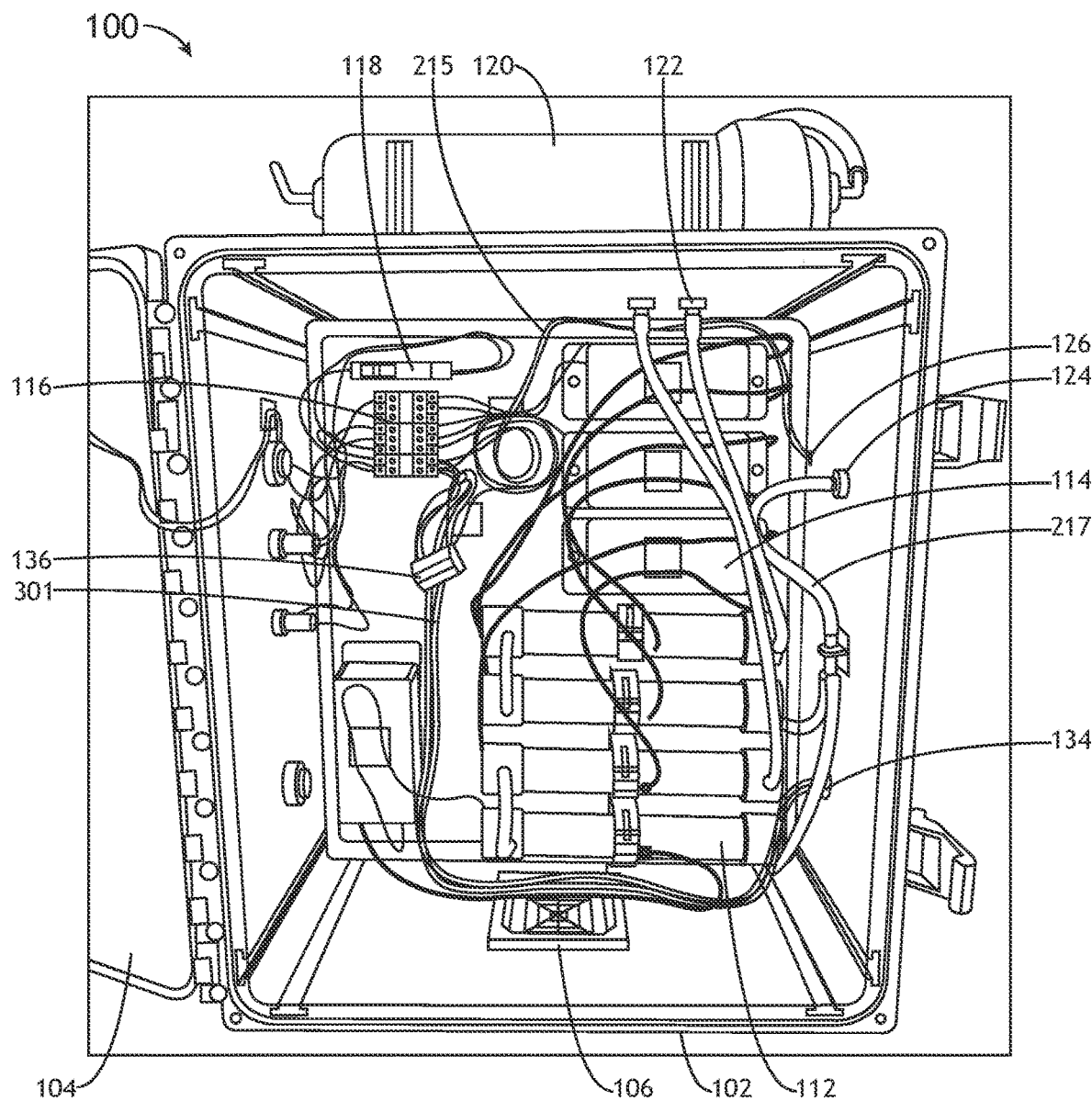
FIG. 10 is a perspective front view of the system illustrated in FIG. 9, wherein the ozone supply unit is opened up to show components that are contained within an ozone supply unit enclosure of the system, in accordance with one or more embodiments of this disclosure.

The flow switch 350 may be communicatively coupled to the one or more controllers 114 by one or more connectors 301 (e.g., wires, cables, optical fibers, etc.) for transmitting signals between the flow switch 350 and the one or more controllers 114. For example, as shown in FIGS. 10 and 13, the flow switch 350 may be communicatively coupled to the ozone supply unit 100 by one or more connectors 301 that are fed through or connected to an opening/port 134 in the ozone supply unit enclosure 102.

As discussed above, the ozone supply unit 100 may include a relay 116 that distributes the incoming signals to the one or more controllers 114. In embodiments, the flow switch 350 is communicatively coupled to the relay 116 by the one or more connectors 301. Further, the system 300 may include one or more additional relays (e.g., relay 136) in the ozone supply unit 100 and/or mixing assemblies 302 for coupling the one or more connectors 301 to the main relay 116 of the ozone supply unit 100. The main relay 116 may be configured to transmit the control signals from the flow switch 350 to the controllers 114, whereby the controllers 114 are programmed to activate the ozone generators 112 in response to receiving one or more control signals indicating a flow of water through the system. Alternatively, the relay 116 itself may be configured to connect the controllers/transformers 114 to power (or to directly power the ozone generators 112 if no controllers/transformers 114 are present) in response to receiving one or more control signals indicating a flow of water through the system. In further embodiments, the ozone supply unit 100 may include a wireless communication interface (e.g., wireless receivers, transmitters, and/or transceivers) for receiving signals from the flow switch 350. For example, the flow switch 350 and one or more of the controllers 114 and/or relay 116 may include or may be coupled with wireless communication interfaces for sending/receiving wireless communication/control signals.

In some embodiments, each of the mixing assemblies 302 is structured and configured in the manner described above. Alternatively, one or more of the secondary mixing assemblies 302 may include a simpler structural configuration. For example, one or more of the mixing assemblies may include a fluid mixer 354 in line with a flow switch 350 in a single fluid pathway, as opposed to the parallel fluid pathways described above. In such embodiments, the control valve 344 is likely not needed in the secondary mixing assembly 302. Furthermore, the system 300 may include any number of mixing assemblies 200 and 302 to create a configurable network of mixing assemblies of any size for any number of output applications.

Although the invention has been described with reference to embodiments illustrated in the attached drawings, equivalents or substitutions may be employed without departing from the scope of the invention as recited in the claims. Components illustrated and described herein are examples of devices and components that may be used to implement embodiments of the present invention and may be replaced with other devices and components without departing from the scope of the invention. Furthermore, any dimensions, degrees, and/or numerical ranges provided herein are to be understood as non-limiting examples unless otherwise specified in the claims.

What is claimed is:

1. A system for generating aqueous ozone solution, comprising:
   an ozone supply unit enclosure having one or more air intake ports and one or more ozone output ports;
   a plurality of ozone generators disposed within the ozone supply unit enclosure, the plurality of ozone generators being fluidically coupled to the one or more air intake ports and the one or more ozone output ports of the ozone supply unit enclosure;
   a plurality of auxiliary compartments fluidically coupled to the ozone supply unit enclosure, each auxiliary compartment of the plurality of auxiliary compartments including a mixing assembly comprised of:
      a first flow path for water to flow through, the first flow path including one or more ozone intake ports, the one or more ozone intake ports being fluidically coupled to the one or more ozone output ports of the ozone supply unit enclosure; and
      a second flow path fluidically coupled in parallel with the first flow path, the second flow path including a control valve that selectively permits a portion of the water to flow through the second flow path to produce a negative pressure in the first flow path so that ozone is drawn into the first flow path through the one or more ozone intake ports and mixed into the water flowing through the first flow path to produce an aqueous ozone solution, wherein the plurality of auxiliary compartments include a primary auxiliary compartment including a first mixing assembly with a first flow rate and at least one secondary auxiliary compartment including a second mixing assembly a second flow rate; and
   a plurality of stop valves for connecting respective mixing assemblies of one or more selected ones of the auxiliary compartments to one or more output applications.

2. The system of claim 1, wherein the first flow rate is different from the second flow rate.

3. The system of claim 1, wherein the primary auxiliary compartment is mounted to an exterior portion of the ozone supply unit enclosure, and the secondary auxiliary compartment is configured to be located at a distance from the ozone supply unit enclosure.

4. The system of claim 1, wherein the plurality of stop valves are further configured to connect the respective mixing assemblies of two or more selected ones of the auxiliary compartments in parallel with one another.

5. The system of claim 1, further comprising:
   a second plurality of stop valves for selectively connecting the one or more output applications to the respective mixing assemblies of the one or more selected ones of the auxiliary compartments.

6. The system of claim 1, wherein the control valve is adjustable to vary the negative pressure produced in the first flow path in order to control an ozone concentration of the aqueous ozone solution.

7. The system of claim 1, wherein the second flow path further includes a flow switch configured to generate a control signal to activate the plurality of ozone generators to generate the ozone in response to sensing the portion of the water flowing through the second flow path.

8. The system of claim 1, further comprising at least one air dryer externally coupled to the ozone supply unit enclosure, the at least one air dryer being configured to remove moisture from air before the air is supplied to the plurality of ozone generators through the one or more air intake ports.

9. The system of claim 1, wherein the plurality of ozone generators includes a first set of ozone generators fluidically connected in series to a first air intake port of the one or more air intake ports and a second set of ozone generators fluidically connected in series to a second air intake port of the one or more air intake ports.

10. The system of claim 9, wherein the first set of ozone generators and the second set of ozone generators are fluidically connected in parallel to an ozone output port of the one or more ozone output ports.

11. The system of claim 1, further comprising a plurality of controllers disposed within the ozone supply unit enclosure, wherein each of the controllers is communicatively coupled to a respective ozone generator of the plurality of ozone generators.

12. The system of claim 1, wherein the ozone supply unit enclosure and the mixing assembly are fluidically coupled by one or more tubes for transferring ozone from the one or more ozone output ports of the ozone supply unit enclosure to the one or more ozone intake ports of the first flow path of the mixing assembly.

13. The system of claim 1, wherein each auxiliary compartment includes at least a first opening for a water input port, a second opening for an aqueous ozone solution output port, and a third opening for the one or more ozone intake ports.

14. A system for generating aqueous ozone solution, comprising:
an ozone supply unit enclosure having one or more air intake ports and one or more ozone output ports;
a plurality of ozone generators disposed within the ozone supply unit enclosure, the plurality of ozone generators being fluidically coupled to the one or more air intake ports and the one or more ozone output ports of the ozone supply unit enclosure;
a primary auxiliary compartment mounted to an exterior portion of the ozone supply unit enclosure, the primary auxiliary compartment including a mixing assembly comprised of:
a first flow path for water to flow through, the first flow path including one or more ozone intake ports, the one or more ozone intake ports being fluidically coupled to the one or more ozone output ports of the ozone supply unit enclosure; and
a second flow path fluidically coupled in parallel with the first flow path, the second flow path including a control valve that selectively permits a portion of the water to flow through the second flow path to produce a negative pressure in the first flow path so that ozone is drawn into the first flow path through the one or more ozone intake ports and mixed into the water flowing through the first flow path to produce an aqueous ozone solution; and
a plurality of secondary auxiliary compartments configured to be located at a distance from the ozone supply unit enclosure, the plurality of secondary auxiliary compartments being fluidically coupled to the ozone supply unit enclosure and including respective mixing assemblies for producing additional aqueous ozone solution; and
a plurality of stop valves for connecting respective mixing assemblies of one or more selected auxiliary compartments from the primary auxiliary compartment and the plurality of secondary auxiliary compartments to one or more output applications.

15. The system of claim 14, wherein the plurality of stop valves are further configured to connect the respective mixing assemblies of two or more selected auxiliary compartments from the primary auxiliary compartment and the plurality of secondary auxiliary compartments in parallel with one another.

16. The system of claim 14, further comprising:
a second plurality of stop valves for selectively connecting the one or more output applications to the respective mixing assemblies of the one or more selected auxiliary compartments from the primary auxiliary compartment and the plurality of secondary auxiliary compartments.

17. The system of claim 14, wherein the control valve is adjustable to vary the negative pressure produced in the first flow path in order to control an ozone concentration of the aqueous ozone solution.

18. A system for generating aqueous ozone solution, comprising:
an ozone supply unit enclosure having one or more air intake ports and one or more ozone output ports;
a plurality of ozone generators disposed within the ozone supply unit enclosure, the plurality of ozone generators being fluidically coupled to the one or more air intake ports and the one or more ozone output ports of the ozone supply unit enclosure; and
a plurality of auxiliary compartments fluidically coupled to the ozone supply unit enclosure, each auxiliary compartment of the plurality of auxiliary compartments including a mixing assembly comprised of:
a first flow path for water to flow through, the first flow path including one or more ozone intake ports, the one or more ozone intake ports being fluidically coupled to the one or more ozone output ports of the ozone supply unit enclosure; and
a second flow path fluidically coupled in parallel with the first flow path, the second flow path including a control valve that selectively permits a portion of the water to flow through the second flow path to produce a negative pressure in the first flow path so that ozone is drawn into the first flow path through the one or more ozone intake ports and mixed into the water flowing through the first flow path to produce an aqueous ozone solution, wherein the second flow path further includes a flow switch configured to generate a control signal to activate the plurality of ozone generators to generate the ozone in response to sensing the portion of the water flowing through the second flow path.

* * * * *